(12) United States Patent
Ogawa et al.

(10) Patent No.: US 8,139,930 B2
(45) Date of Patent: Mar. 20, 2012

(54) INFORMATION RECORDING MEDIUM, DEVICE AND METHOD FOR PLAYING BACK 3D IMAGES

(75) Inventors: Tomoki Ogawa, Osaka (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 12/354,264

(22) Filed: Jan. 15, 2009

(65) Prior Publication Data
US 2009/0220213 A1 Sep. 3, 2009

Related U.S. Application Data

(60) Provisional application No. 61/021,817, filed on Jan. 17, 2008.

(51) Int. Cl.
*H04N 5/76* (2006.01)
*H04N 9/80* (2006.01)
*H04N 5/917* (2006.01)
*H04N 5/92* (2006.01)
*H04N 5/93* (2006.01)

(52) U.S. Cl. ........ 386/341; 386/241; 386/329; 386/337; 386/353; 386/356

(58) Field of Classification Search .................... 386/46, 386/95, 109, 125, 126, 239, 241, 248, 326–340
See application file for complete search history.

(56) References Cited

U.S. PATENT DOCUMENTS
6,181,872 B1 * 1/2001 Yamane et al. ............... 386/332
2003/0053797 A1 * 3/2003 Oshima et al. ................ 386/98
2005/0123279 A1 * 6/2005 Takakuwa et al. ............. 386/95
2009/0263105 A1 * 10/2009 Sato et al. ..................... 386/95
2009/0288125 A1 11/2009 Morioka FOREIGN PATENT DOCUMENTS
JP 2000-270347 9/2000
JP 2004-240469 8/2004
WO 97/32437 9/1997
WO WO 2006/025527 * 3/2006
WO 2007/010779 1/2007

OTHER PUBLICATIONS

Nonaka, Hidetoshi and Date, Tsutomu, "*Video System with Properties of Binocular and Motor Vision*", Transactions of the Society of Instrument and Control Engineers, vol. 27, No. 10, pp. 1144-1151, 1991 (with verified English translation).

* cited by examiner

*Primary Examiner* — Thai Tran
*Assistant Examiner* — Hung Dang
(74) *Attorney, Agent, or Firm* — Wenderoth Lind & Ponack, L.L.P.

(57) ABSTRACT

A recording medium allows random access to be performed in playing back 3D graphics. The recording medium includes a digital stream area where a digital stream including temporally-arranged GOP pairs is recorded, and a map information area where map information is recorded. The map information indicates entry addresses in one to one correspondence with entry times on a time axis of the digital stream, and each entry address shows a beginning of a corresponding GOP pair region in the digital stream area. Each GOP pair includes first-type and second-type GOPs, wherein each first-type GOP is data indicating a plain view picture set to be played back from a corresponding entry time, and each second-type GOP is data to be played back with a corresponding first-type GOP to provide a stereoscopic view. The data indicates a difference between a stereoscopic picture set and the plain view picture set.

8 Claims, 24 Drawing Sheets

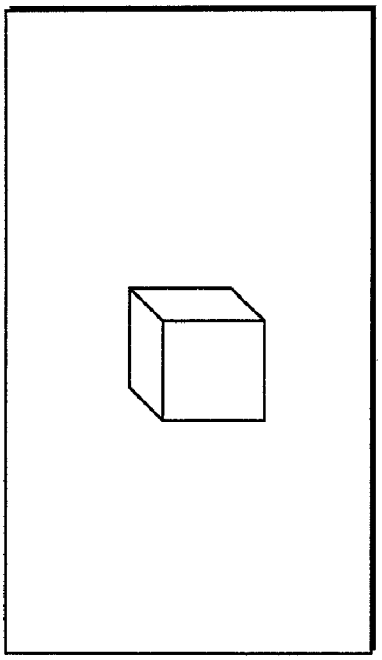
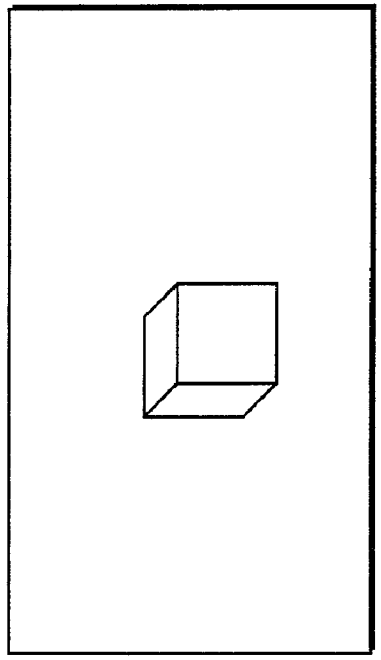
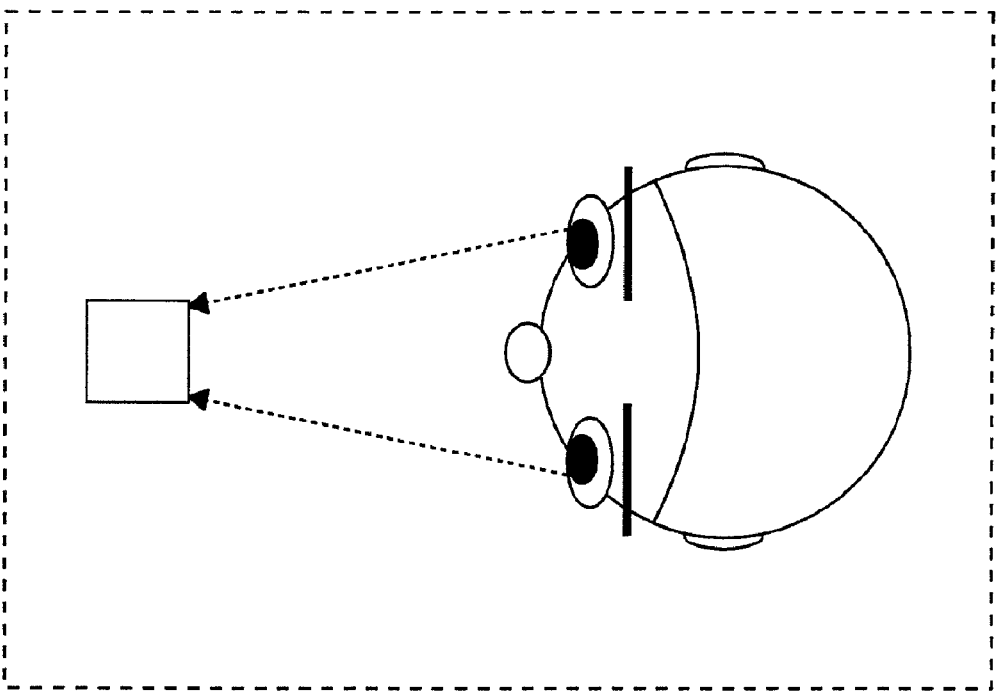

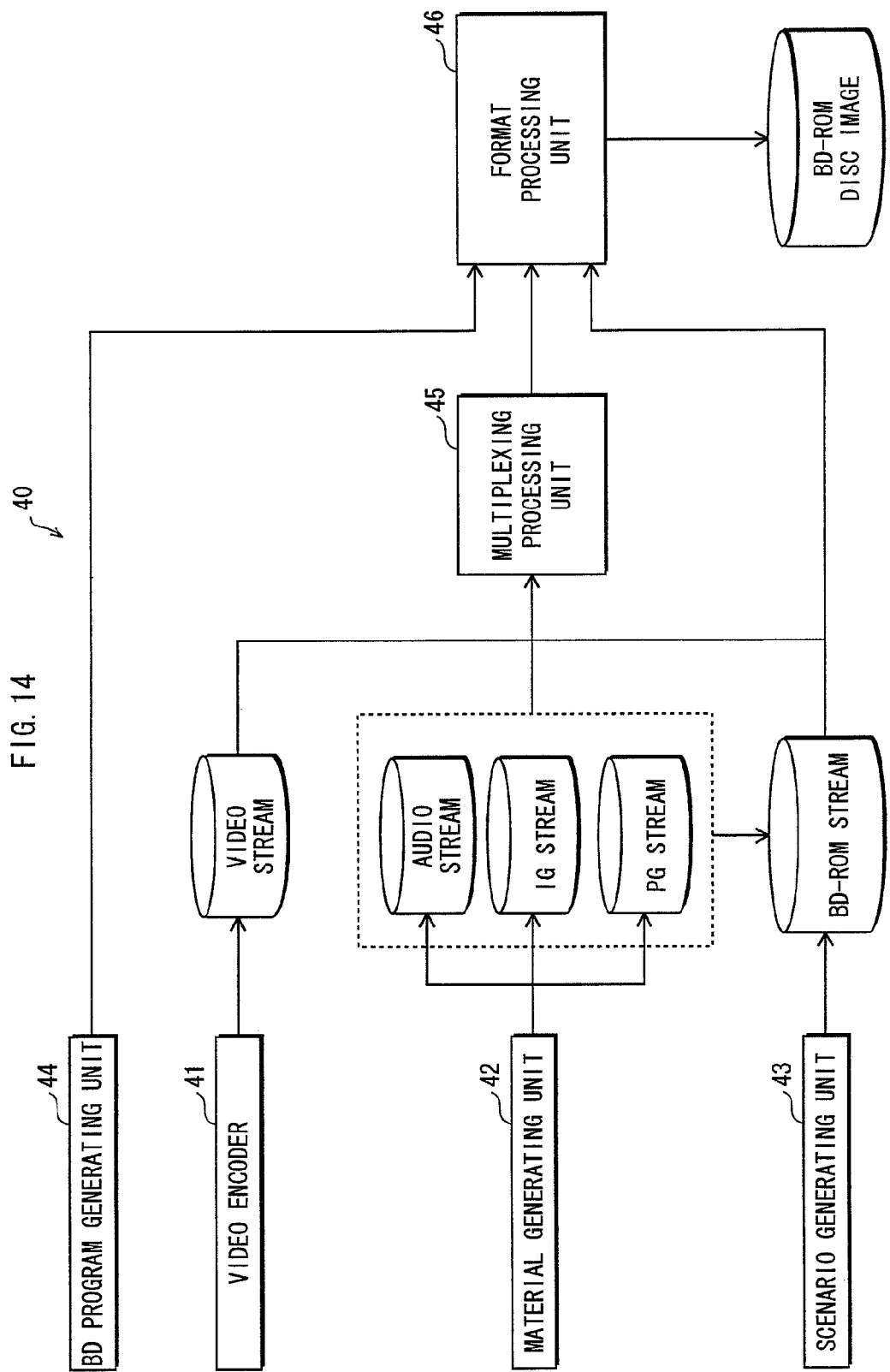

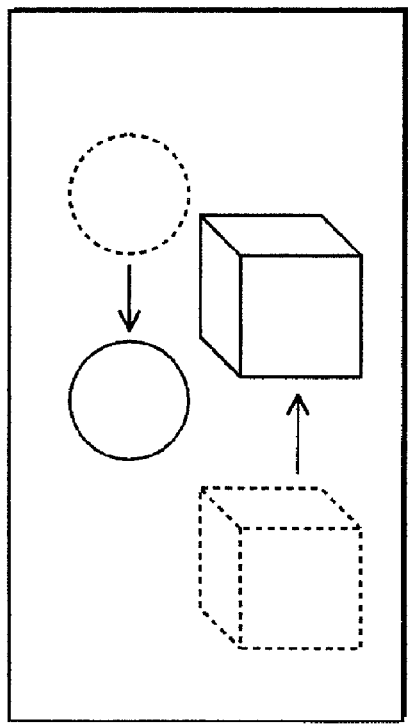
FIG. 15A
FIG. 15B
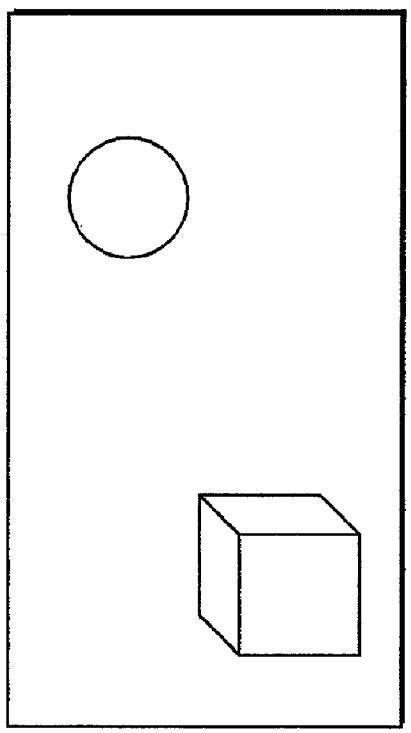
FIG. 15C
| SEARCH TARGET | MOVING DIRECTION | MOVING DISTANCE |
|---|---|---|
| CUBE | RIGHT | 20 |
| CIRCLE | LEFT | 10 |

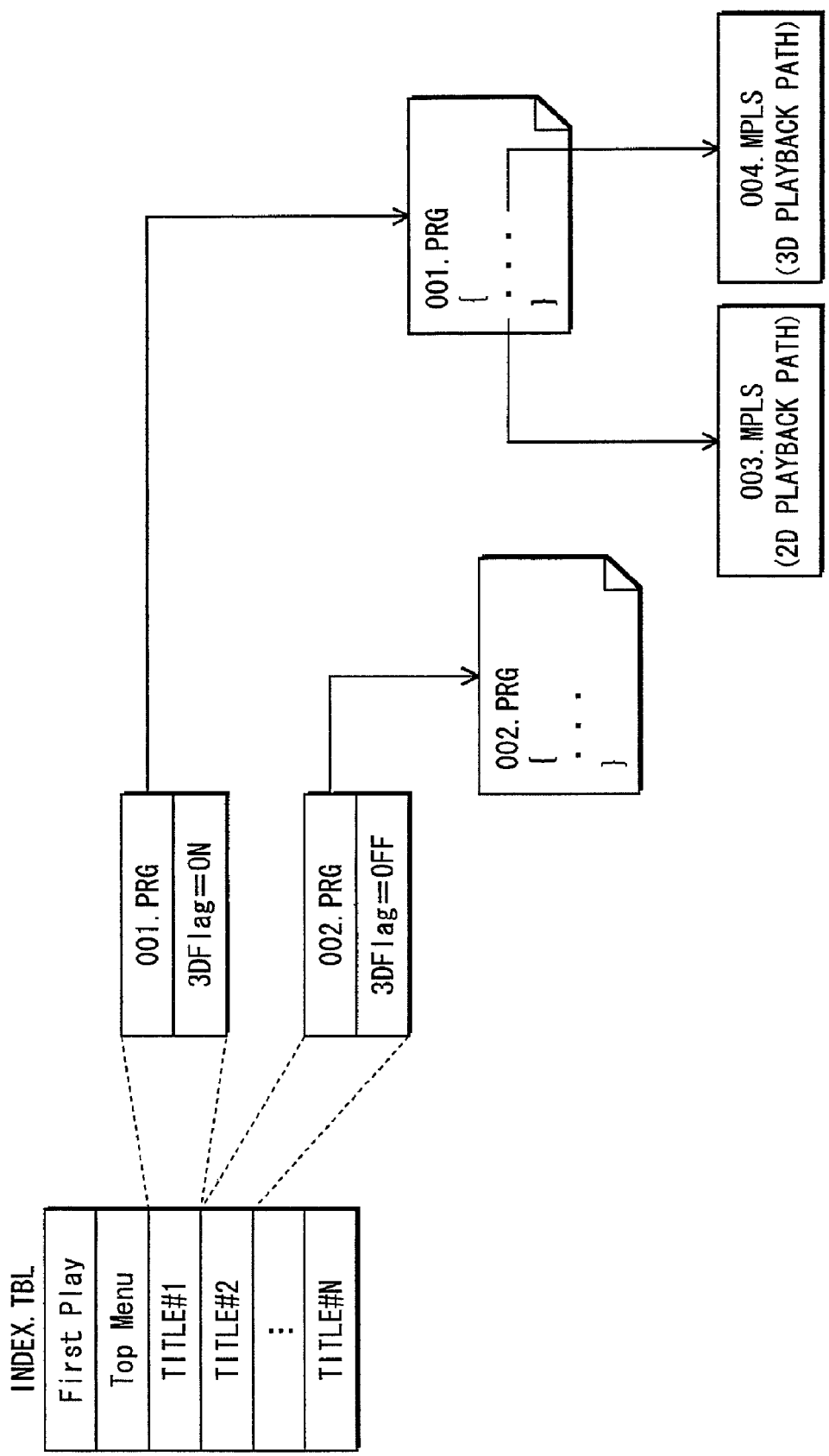

FIG. 23

| | POP-OUT LEVEL | CORRESPONDING AUDIO | CORRESPONDING SUBTITLE | CORRESPONDING MENU |
|---|---|---|---|---|
| SUB CLIP 1 | HIGH | AUDIO 1 | SUBTITLE 1 | MENU 1 |
| SUB CLIP 2 | MEDIUM | AUDIO 2 | SUBTITLE 2 | MENU 2 |
| SUB CLIP 3 | LOW | AUDIO 3 | SUBTITLE 3 | MENU 3 |

INFORMATION RECORDING MEDIUM, DEVICE AND METHOD FOR PLAYING BACK 3D IMAGES

This application claims benefit of Provisional application No. 61/021,817 filed Jan. 17, 2008.

BACKGROUND OF THE INVENTION (1) Field of the Invention

The present invention relates to an application format when 3D graphics is recorded on a recording medium.

(2) Description of the Related Art

In recent years, the next generation DVD standards called the Blu-ray disc and HD DVD have been established, and therefore high definition and high-quality sound optical discs have been common among users.

Regarding quality of moving images that can be recorded on such optical discs, while conventional DVDs are SD (Standard Definition), Blu-ray discs are HD (High Definition) with resolutions up to 1920×1080, and therefore can store therein images having higher image quality.

In recent years, the number of visitors to movie theaters has been decreasing with the expansion of package media such as DVDs. Therefore, in the U.S. and in Japan, establishment of movie theaters in which visitors can enjoy three dimensional movies (3D movies) have been encouraged in order to increase the number of visitors to movie theaters. One of the factors that contributes to such changes in the movie theaters is that an environment has been developed in which 3D graphics can be generated comparatively easily since numerous recent movies have been made using CG (computer graphics).

In view of such a background, 3D content recorded on the above-mentioned next generation DVDs such as Blu-ray discs and HD DVDs will be desired by many users.

SUMMARY OF THE INVENTION

Although being capable of simply playing back 3D content from beginning to end is enough at the movie theaters, such playback is not enough in order to introduce the 3D technology to homes in a form of an optical disc. That is, it is necessary to ensure that random access and the like can be performed as before in terms of usability for users when introducing the 3D technology to homes. As a method of realizing 3D viewing at home, a method of using parallax video (composed of two video streams that are based on binocular parallax) may be taken into consideration. In that case, it is problematic how to synchronize the two video streams at the time of random access in order to ensure that random access can be performed. If the two video streams cannot be synchronized, a time period might occur in which one video stream can be properly decoded while the other video stream cannot be decoded when the user plays back from an arbitrary time point at which random access can be performed. This is because data necessary for playback is not provided to a decoder. As a result, stereoscopic viewing using parallax video cannot be performed in such time period.

The present invention has an objective to provide a recording medium with which random access can be reliably performed in playing back 3D graphics.

In order to achieve the above objective, one aspect of the present invention is a recording medium comprising: a digital stream area in which a digital stream is recorded, the digital stream including a plurality of temporally-arranged GOP (group of pictures) pairs; and a map information area in which map information is recorded, the map information indicating entry addresses in one to one correspondence with entry times on a time axis of the digital stream, each of the entry addresses showing a beginning of a corresponding one of GOP pair regions in the digital stream area, wherein each of the GOP pairs is composed of a first-type GOP and a second-type GOP, each first-type GOP is data indicating a set of plain view pictures to be played back from a corresponding one of the entry times, and each second-type GOP is data to be played back together with a corresponding one of the first-type GOPs to provide a user with a stereoscopic view of the digital stream, the data indicating a difference between a set of stereoscopic pictures and the set of plain view pictures.

With the above-stated structure, since the pairs of the first group of pictures and the second group of pictures exists in the GOP pair regions indicated by the entry addresses in the recording area of the digital stream that correspond to the entry times, it is possible to reliably allow a user to perform stereoscopic viewing of moving pictures even when playback starts at an arbitrary entry time on the time axis of the digital stream. Therefore, the user can easily enjoy viewing 3D graphics at home.

Each of the first-type GOPs and each of the second-type GOPs may be divided into a first-type set of packets and a second-type set of packets, respectively, the first-type sets of packets and the second-typesets of packets may be multiplexed together, all of the packets being assigned with consecutive packet numbers according to an order of multiplexing, a header packet from among each of the first-type sets of packets may precede, on the digital stream, a header packet from among a corresponding one of the second-type sets of packets, and each of the entry addresses in the map information may be represented as one of the packet numbers assigned to a header packet from among a corresponding one of the first-type sets of packets.

The entry addresses each showing a header packet of a corresponding first-type GOP are in one to one correspondence with the entry times. Therefore, by reading packets from the recording medium in accordance with the entry addresses, it is possible to reliably send the first group of pictures to a video decoder without sending unnecessary data. Therefore, it is possible to immediately provide stereoscopic viewing starting from an entry point desired by the user when random access is performed on a video stream.

Each of the second-type sets of packets divided from a corresponding one of the second-type GOPs may be located before a next one of the entry addresses that is immediately next to one of the entry addresses that relates to a corresponding one of the first-type GOPs.

It is ensured that a complete pair of the first group of pictures and the second group of pictures can be sent to the video decoder by reading packets from a packet (m) indicated by an entry address (i) to a packet (n−1) immediately preceding a packet (n) indicated by an entry address (i+1). Since it is ensured, in the case of performing random access with reference to the map information, that the complete pair of the first group of pictures and the second group of pictures which can provide stereoscopic viewing are sent to the video decoder, the decoder can realize high-speed operation that quickly responds to a skip operation by the user.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIGS. 1A, 1B and 1C show principles of stereoscopic viewing using parallax video;

FIG. 14 is a block diagram showing an internal structure of a recording apparatus 40;

FIGS. 15A, 15B and 15C show how to effectively generate an elementary stream of 3D video;

FIG. 16 shows a structure of an index table including 3D flags;

FIG. 23 shows a table in which each sub clip is in correspondence with an audio data piece, a subtitle and a menu.

Figure 2:
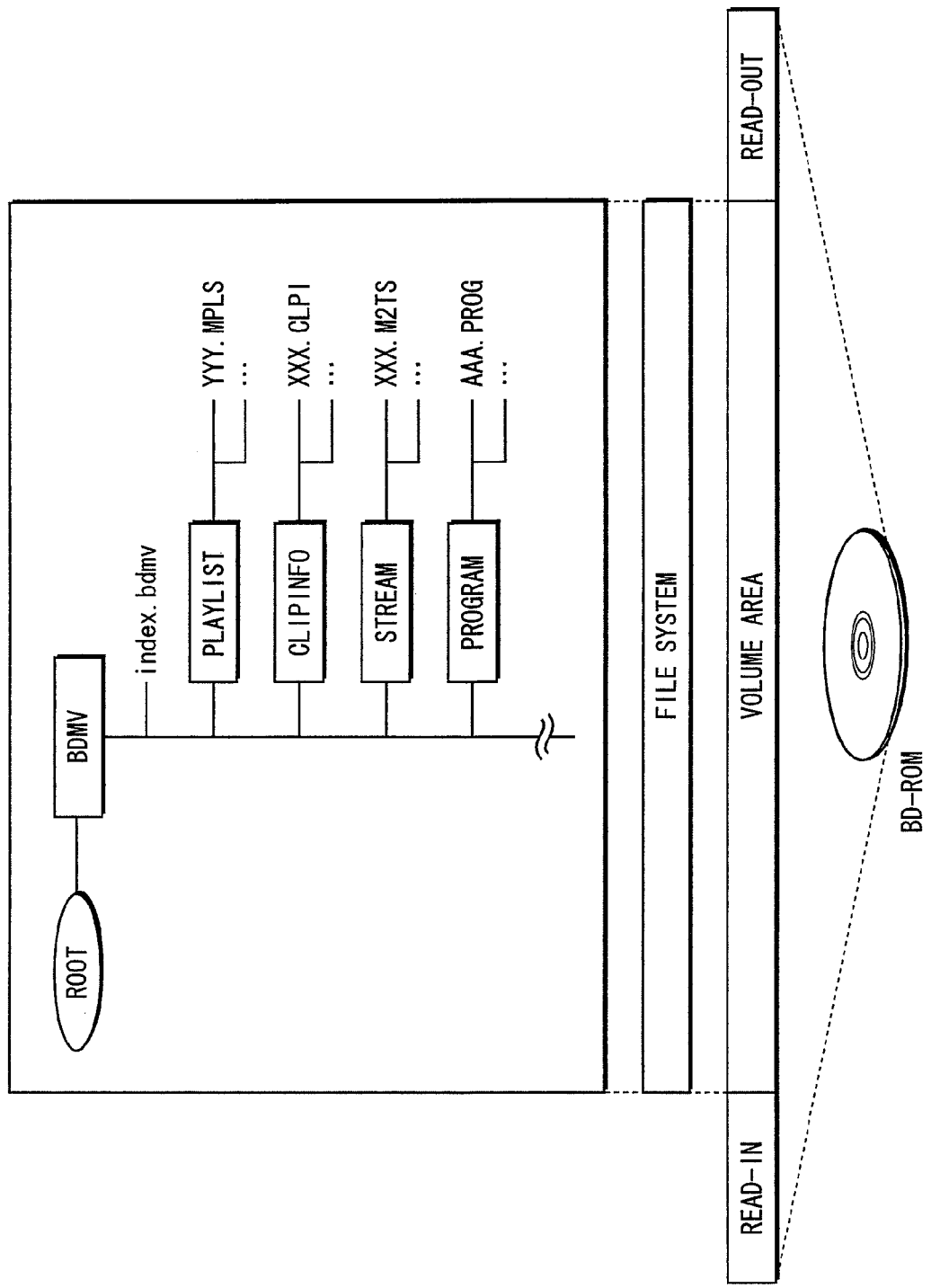
FIG. 2 shows a structure of a BD-ROM.

| DESCRIPTION OF NUMERAL REFERENCES | |
|---|---|
| 1000 | BD-ROM |
| 2000 | playback apparatus |
| 2100 | BD-ROM drive |
| 2200 | track buffer |
| 2300 | system target decoder |

| DESCRIPTION OF NUMERAL REFERENCES | |
|---|---|
| 2301 | demultiplexer |
| 2302 | video decoder |
| 2303 | left-eye video plane |
| 2304 | right-eye video plane |
| 2305 | sub video decoder |
| 2306 | sub video plane |
| 2307 | PG decoder |
| 2308 | PG plane |
| 2309 | IG decoder |
| 2310 | IG plane |
| 2311 | image processor |
| 2312 | image plane |
| 2313 | audio decoder |
| 2400 | plane adder |
| 2500 | program memory |
| 2600 | management information memory |
| 2700 | program execution unit |
| 2800 | playback control unit |
| 2900 | user event processing unit |
| 3000 | display |
| 4000 | stereoscopic glasses |
| 5000 | remote control |
| 40 | recording apparatus |
| 41 | video encoder |
| 42 | material generating unit |
| 43 | scenario generating unit |
| 44 | BD program generating unit |
| 45 | multiplexing processing unit |
| 46 | format processing unit |

DETAILED DESCRIPTION OF THE INVENTION

The following describes the embodiments of the present invention with reference to the drawings.

First Embodiment

1. Principles of Stereoscopic Viewing

Firstly, the following describes the principles of providing stereoscopic viewing using a display for home use. There are two major methods of realizing stereoscopic viewing: a method using holography technology and a method using parallax video (composed of two video streams that are based on binocular parallax).

The method using the holographic technology can allow us to view an object in an image stereoscopically in exactly the same manner as we usually recognize a physical object. However, although technical theory has been established, it is very difficult, in the case of moving images, to realize, with current technology, the stereoscopic viewing using the holographic technology since the following computer and display device are necessary: the computer capable of performing an enormous amount of calculation to generate moving images for the holography in real time, and the display device having a resolution great enough to draw thousands of lines in a space as small as 1 mm. Therefore, it is a reality that the holographic technology has rarely been realized for commercial purposes.

In the method using parallax video, on the other hand, the stereoscopic viewing can be realized by preparing pictures for a right eye (right-eye pictures) and pictures for a left eye (left-eye pictures), and allowing the right eye pictures to be seen only by the right eye, and the left-eye pictures to be seen only by the left eye. FIGS. 1A, 1B and 1C show principles of stereoscopic viewing using parallax video. FIG. 1A is a top view showing how the user looks at a comparatively small cube in front of the user, FIG. 1B shows how the cube looks when the user looks at the cube with the left eye, and FIG. 1C shows how the cube looks when the user looks at the cube with the right eye. As shown in FIGS. 1B and 1C, angles from which a picture is captured are different between the left and right eyes. The stereoscopic viewing is realized by combining, in the brain, such pictures captured by the left and right eyes from different angles.

This method has a merit that stereoscopic viewing can be realized by preparing only two pictures (one for the right eye, and the other for the left eye) viewed from different observing points. Some technologies using this method have been put to practical use by technology focusing on how to allow pictures each corresponding to the right eye and the left eye to be seen only by the corresponding eyes.

One of the technologies is called a successive separation method. In such method, the left-eye pictures and the right-eye pictures are displayed alternately on the display. When the user observes the displayed pictures through successive-type stereo glasses (with liquid crystal shutters), left and right scenes are superimposed onto each other by spectrum reaction of eyes. Thus, the user recognizes the pictures as stereoscopic pictures. More specifically, at the moment when a left-eye picture is displayed on the display, the successive type stereo glasses bring a liquid crystal shutter for the left eye into a light-transmitting state, and a liquid crystal shutter for the right eye into a light-blocking state. At the moment when a right-eye picture is displayed on the display, on the other hand, the successive-type stereo glasses bring the liquid crystal shutter for the right eye into the light-transmitting state, and the liquid crystal shutter for the left eye into the light-blocking state. With such method, the left-eye and right-eye pictures can be seen by corresponding eyes.

Thus, in order to alternately display left-eye pictures and right-eye pictures in the time axis direction, for example, it is necessary to display 48 pictures (a sum of right and left pictures) in a second in the successive separation method while only 24 pictures are displayed in a second in a standard two dimensional movie. Accordingly, such method is suitable for use in a display capable of performing rewriting of a screen comparatively fast.

Another technology uses a lenticular lens. The left-eye pictures and the right-eye pictures are alternatively displayed in the time axis direction in the above-mentioned successive separation method. However, in the technology using a lenticular lens, left-eye pictures and right-eye pictures are arranged alternatively in a longitudinal direction on a screen simultaneously, and the lenticular lens is attached to the surface of the display. When the user views pictures displayed on the display through the lenticular lens, the pixels composing the left-eye pictures are viewed only by the left eye, and the pixels composing the right-eye pictures are viewed only by the right eye. Since it is possible to allow the right eye and the left eye to view the pictures having parallax, the user can recognize the pictures displayed on the display as stereoscopic pictures. Note that this is not limited to a lenticular lens, and a device having the same function (e.g. liquid crystal element) may be used. A further alternative is a method by which vertical polarized filters are provided on pixels for the left eye and horizontal polarized filters are provided on pixels for the right eye, and the user uses polarized glasses in which (i) a vertical polarized filter is provided on a lens for the left eye and (ii) a horizontal filter is provided with a lens for the right eye. This allows the user to recognize the displayed pictures stereoscopically.

The above-mentioned method of providing stereoscopic viewing using the parallax video has been commonly used in equipment in amusement parks, and has been technically established. Therefore, such method is the closest to being realized for household use. Other than such a method, various technologies such as a two-color separation method and the like have been suggested as a method for providing stereoscopic viewing using parallax video.

Although a description is given taking the successive separation method and the polarized glasses method as examples, methods for providing stereoscopic viewing using parallax video are not limited to these, and can be any methods that use parallax video.

2. Data Structure for Storing Parallax Video (Hereinafter Also Referred to as "3D Pictures") for Allowing the User to Perform the Stereoscopic Viewing The following describes a data structure for storing 3D pictures in a BD-ROM which is a recording medium pertaining to the present application.

FIG. 2 shows a structure of the BD-ROM. The BD-ROM is shown in a fourth tier from the top in the present figure, and a track on the BD-ROM is shown in a third tier. Although the track is usually formed in a spiral manner from an inner circumference to an outer circumference, the track is drawn in a laterally-expanded manner in the present figure. This track consists of a read-in area, a volume area and a read-out area. The volume area in the present figure has a layer model having a physical layer, a file system layer and an application layer. A top tier of FIG. 2 shows an application layer format (application format) of the BD-ROM expressed using a directory structure. As shown in the present figure, in the BD-ROM, a BDMV directory is immediately below a ROOT directory; and an index file (index. bdmv), a PLAYLIST directory, a CLIPINFO directory, a STREAM directory and a PROGRAM directory exist below the BDMV directory.

An index table showing a title structure is stored in a index file (index. bdmv). Titles are units of playback. For example, a main film is recorded in a first title, a director's cut is recorded in a second title, and bonus content is recorded in a third title. The user can specify a title to play back (e.g. specifying "play back Nth title") using a remote control or the like that comes with the playback apparatus.

Figure 3:
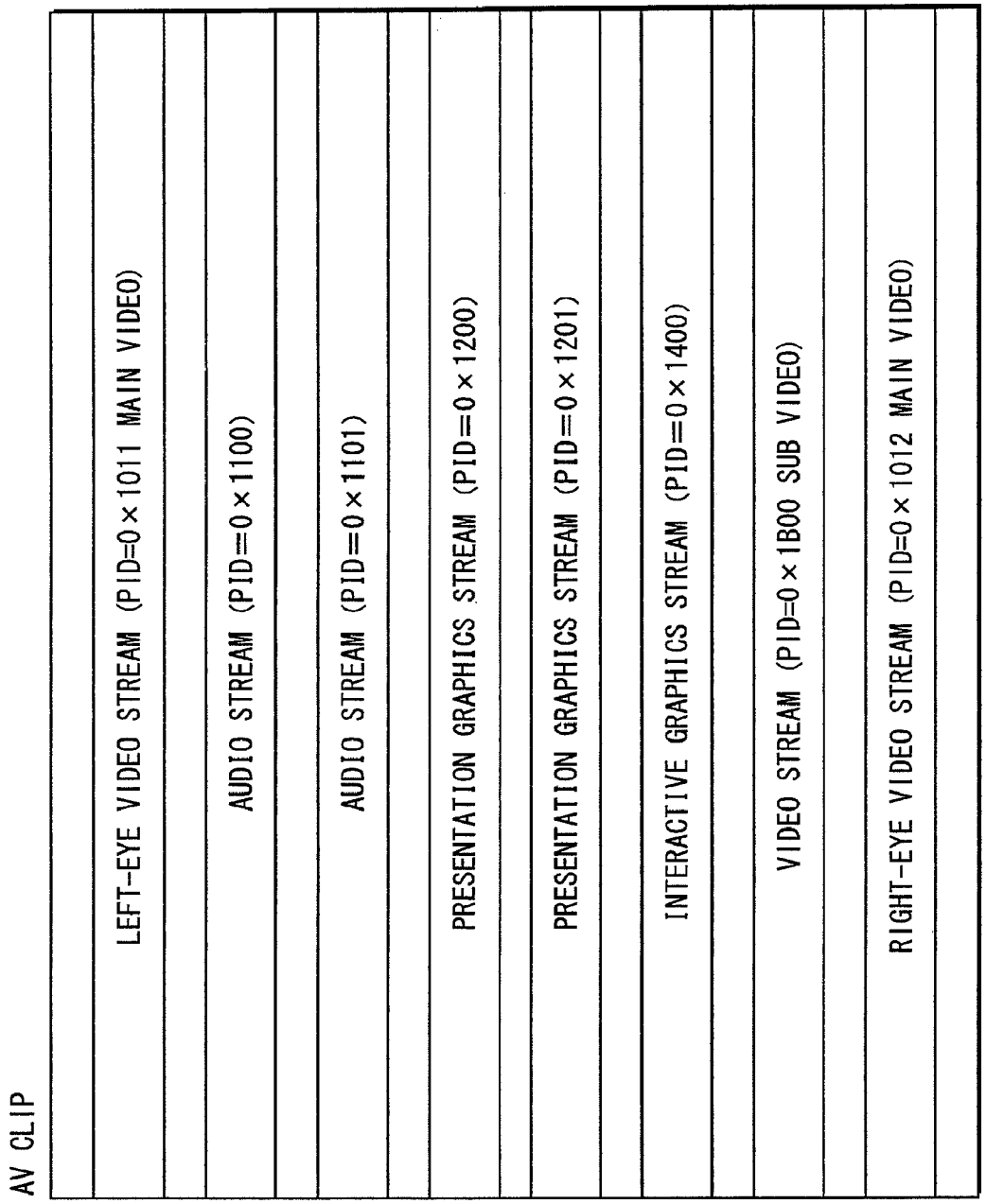
FIG. 3 shows an example of a structure of an AV clip stored in a file (XXX. M2TS)

In a STREAM directory is stored a file (XXX. M2TS) including therein an AV clip in which AV contents such as video and audio are multiplexed. FIG. 3 shows an example of a structure of an AV clip stored in the file (XXX. M2TS). As shown in FIG. 3, in the file (XXX. M2TS) is stored a digital stream in a form of MPEG-2 transport stream. In such digital stream, a video stream for the left eye (left-eye video stream), a video stream for the right eye (right-eye video stream) and the like are multiplexed. Here, the left-eye video stream is played back as 2D video, and also is played back as video for the left eye in the case of allowing the user to perform stereoscopic viewing of moving pictures (in the case of playing back the digital stream as 3D video). The right-eye video stream is played back together with the left-eye video stream in the case of allowing the user to perform stereoscopic viewing of moving pictures. Also, as shown in FIG. 3, 0x1011 is allocated to the left-eye video stream as a PID, and 0x1012 which is different from the PID of the left-eye video stream is allocated to the right-eye video stream. This allows the video streams to be distinguished from each other. Each of the video streams is recorded after having been compressed and encoded according to the MPEG-2 method, MPEG-4 AVC method, SMPTE VC-1 method or the like. An audio stream is recorded after having been compressed and encoded according to the Dolby AC-3 method, Dolby Digital Plus method, MLP method, DTS method, DTS-HD method, linear PCM method or the like.

Figure 4:
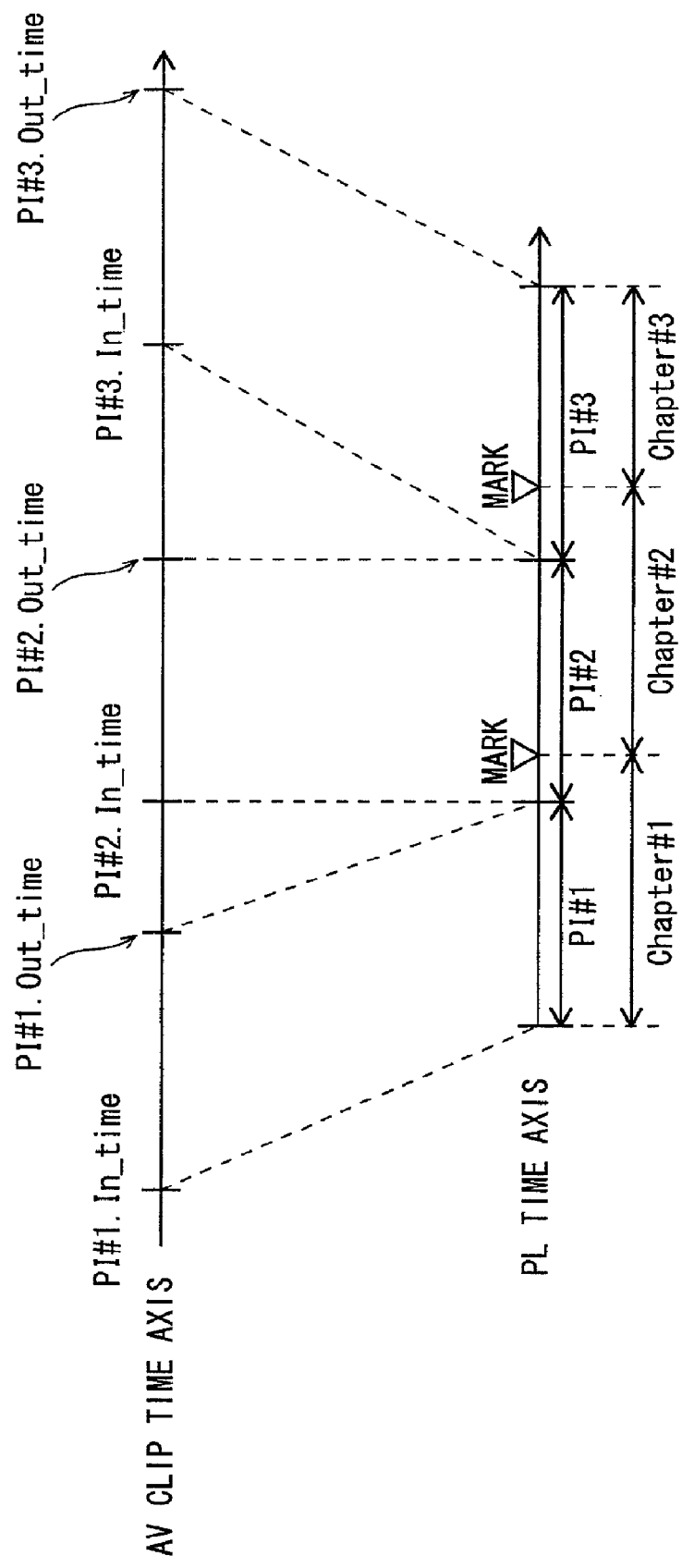
FIG. 4 shows a relationship between the AV clip and the PL.

In a PLAYLIST directory is stored a play list file (YYY. MPLS) including therein play list information in which a logical playback path (PL) in the AV clip is defined. FIG. 4 shows a relationship between the AV clip and the PL. As shown in FIG. 4, play list information is composed of one or more play item (PI) information pieces. Each of the play item information pieces represents a playback section in the AV clip. Each of the play item information pieces is identified by a play item ID, and is written in playback order in the play list.

Also, the playlist information pieces include entry marks each showing a playback start point. The entry marks can be provided in the playback sections defined in the play item information pieces. Also, as shown in FIG. 4, each of the entry marks is located in a position to be a playback start point in the play item information, and is used for cue playback. For example, chapter playback can be performed by providing an entry mark to a position to be a start of each chapter in a movie title. Note that a playback path of a set of play item information pieces is defined as a main path.

Figure 5:
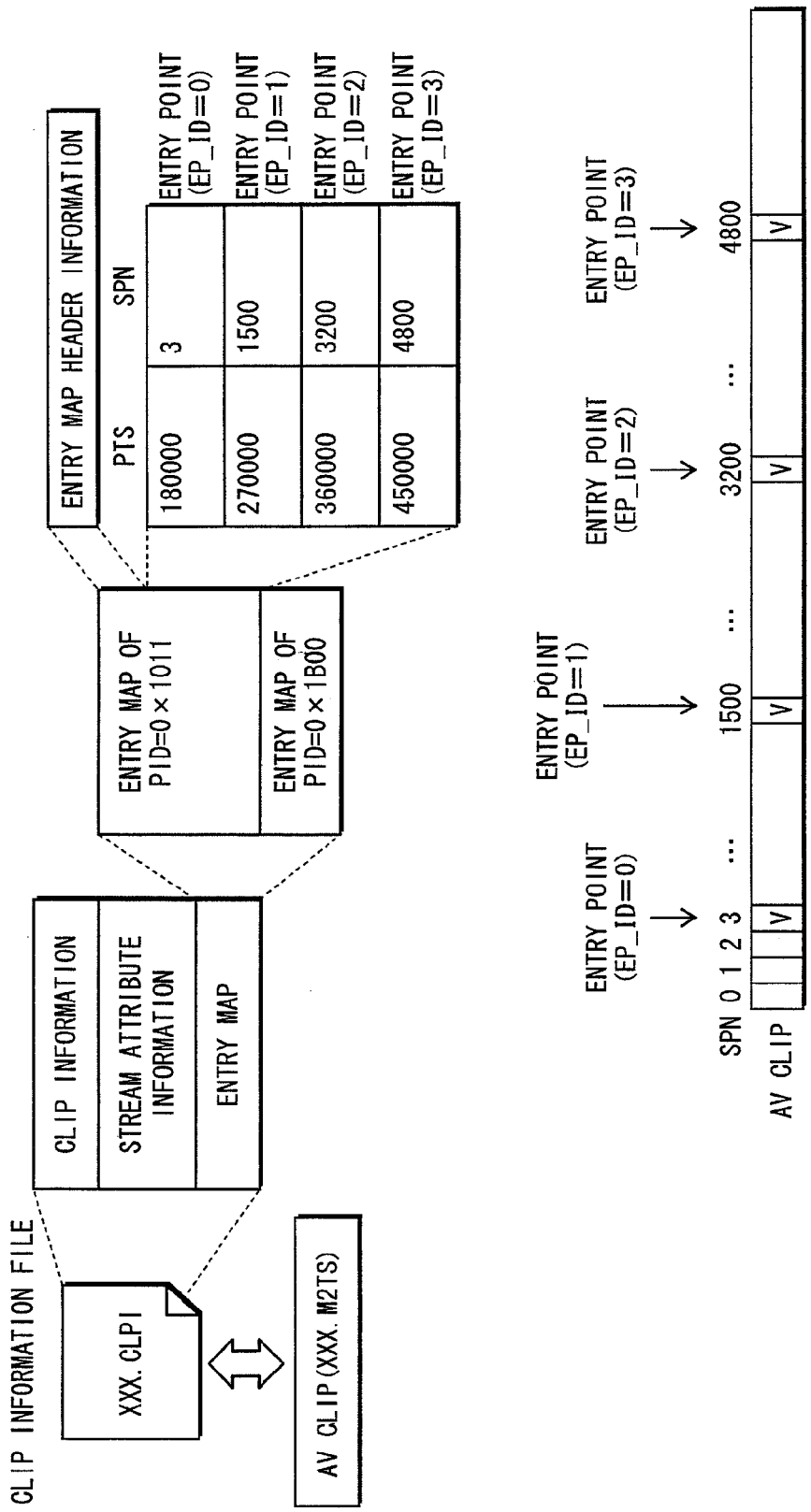
FIG. 5 shows an example of management information of an AV clip stored in a clip information file.

In a CLIPINFO directory is stored a clip information file (XXX. CLPI) including therein management information on the AV clip. FIG. 5 shows an example of management information on the AV clip stored in the clip information file. As shown in FIG. 5, the management information on the AV clip is in one to one correspondence with the AV clip, and is composed of clip information, stream attribute information and entry maps.

In each of the entry maps are written entry map header information, table information, and another table information relating to a video stream (sub video). Here, the table information shows pairs each of which is composed of (i) a PTS (Presentation Time-Stamp) showing a display time of a head of each of GOPs that compose the left-eye video stream, and (ii) a SPN (Source Packet Number) showing a start position of each of the GOPs in the AV clip. Here, information on each of the pairs of PTSs and SPNs shown in one row is called an entry point. Also, values starting from 0 each of which is incremented by one in order are called an entry point ID (hereinafter also referred to as "EP_ID").

Also, in the entry map header information are stored information on a PID of the left-eye video stream, the number of entry points and the like.

By referring to such entry maps, the playback apparatus can, when the playback start point is specified by time, convert time information into address information, and specify a packet point on an AV clip. The packet point corresponds to an arbitrary point on a time axis of the video stream.

In a PROGRAM directory is stored a BD program file (AAA. PROG) including therein a program for defining a dynamical scenario.

In a BD-ROM, although a proprietary interpreter-type program called "command navigation" is used, a language system is not an essence of the present invention. Therefore, a program written by a general-purpose programming language such as Java or Java script is also possible. A play list to be played back is specified by such program.

3. PTSs of a Left-Eye Video Stream and a Right-Eye Video Stream

The following describes PTSs of the left-eye video stream and the right-eye video stream for allowing the user to perform stereoscopic viewing of the moving pictures.

Figure 6:
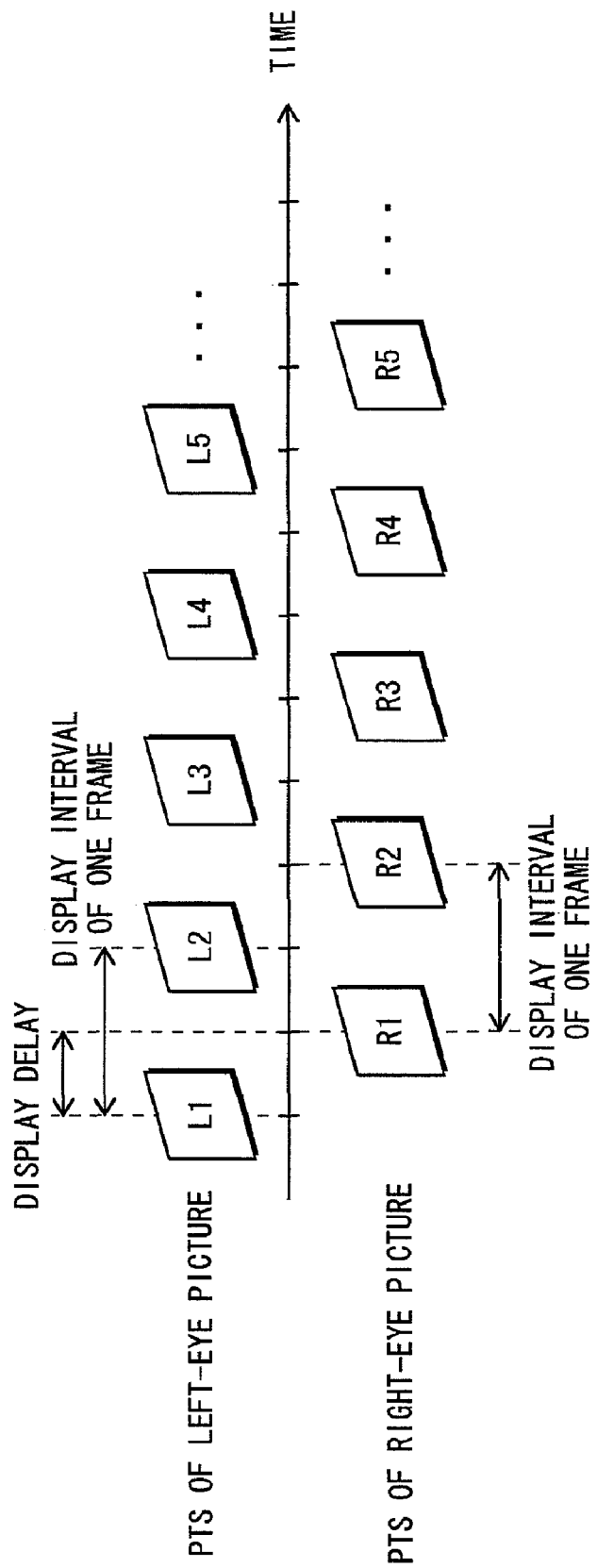
FIG. 6 shows a relationship between PTSs allocated to a plurality of pictures composing a video stream for a left eye (left-eye video stream) and PTSs allocated to a plurality of pictures composing a video stream for a right eye (right-eye video stream)

FIG. 6 shows a relationship between a display time (PTS) allocated to each of a plurality of pictures that compose the left-eye video stream, and a display time (PTS) allocated to each of a plurality of pictures that compose the right-eye video stream. The pictures composing the left-eye video stream (left-eye pictures) are in one to one correspondence with the pictures composing the right-eye video stream (right-eye pictures) (e.g. a picture L1 and a picture R1 as shown in FIG. 6 correspond to each other). PTSs are set such that the left-eye pictures that are in correspondence with the right-eye pictures are displayed before the corresponding right-eye pictures. Also, PTSs for the left-eye pictures and PTSs for the right-eye pictures are set so as to alternate each other on a time axis. This can be realized by setting the PTSs such that the left-eye pictures and the right-eye pictures that are in a reference relationship of an intra-picture prediction coding are displayed alternately.

The following describes the left-eye pictures and the right-eye pictures that are in the reference relationship of the intra-picture prediction coding. The right eye pictures are compressed by an intra-picture prediction coding that is based on redundancy between views in addition to an intra-picture prediction coding that is based on redundancy in a time-axis direction. That is, the right-eye video pictures are compressed with reference to the corresponding left-eye pictures. The following describes the reasons for this. The left-eye pictures and the right-eye pictures strongly correlate to each other since objects of the left-eye pictures and the right-eye pictures are the same though views thereof are different. Therefore, the data amount of right-eye video stream can be greatly reduced compared to the data amount of the left-eye video stream by performing the intra-picture prediction coding between the views.

Figure 7:
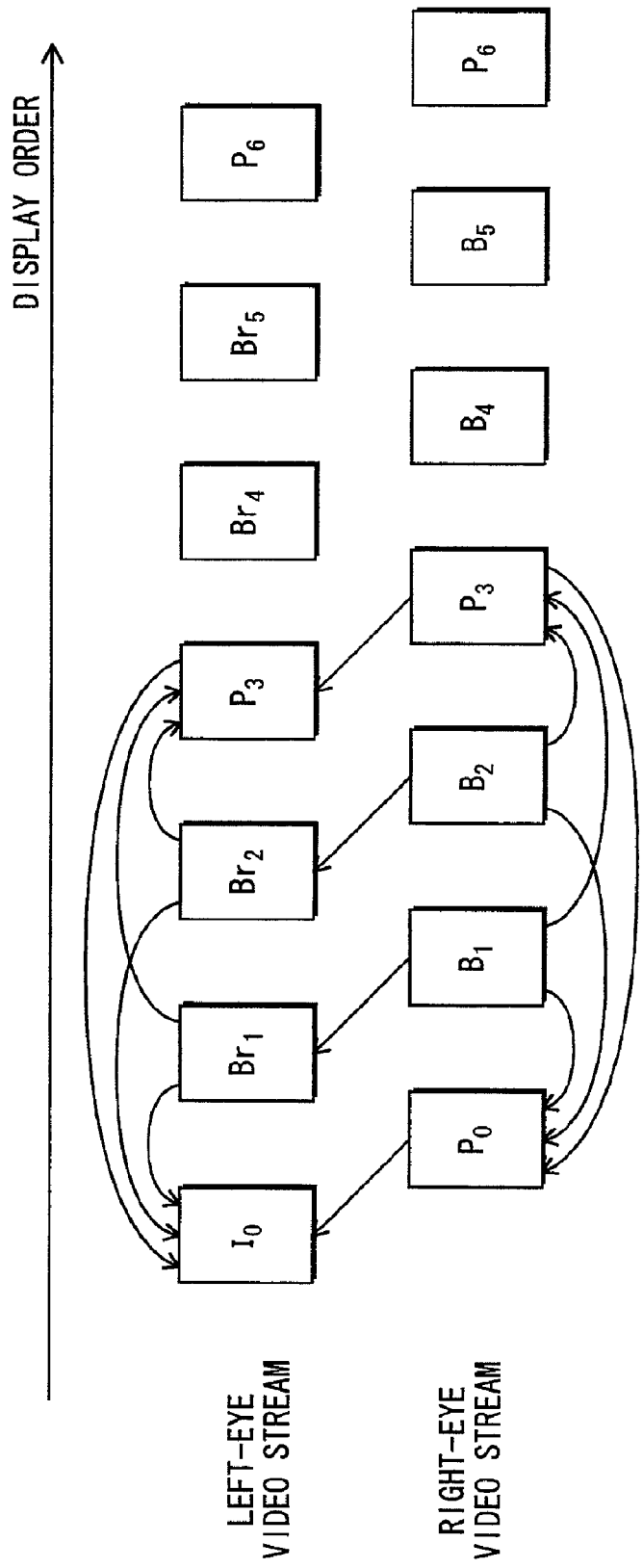
FIG. 7 shows a reference relationship between pictures.

FIG. 7 shows a reference relationship between pictures. As shown in FIG. 7, a $P_0$ picture of the right-eye video stream refers to an $I_0$ picture of the left-eye video stream. A $B_1$ picture of the right-eye video stream refers to a $Br_1$ picture of the left-eye video stream. A $B_2$ picture of the right-eye video stream refers to a $Br_2$ picture of the left-eye video stream. A $P_3$ picture of the right-eye video stream refers to $P_3$ picture of the left-eye video stream.

Since the left-eye video stream does not refer to the right-eye video stream, the left-eye video stream alone can be played back (i.e. the left-eye video stream can be played back as 2D video). However, the right-eye video stream alone cannot be played back since the right-eye video stream refers to the left-eye video stream.

The following describes the time interval between PTSs of the left-eye pictures and PTSs of the corresponding right-eye pictures using FIG. 6. When 3D graphics is played back using the successive separation method, each PTS for the right-eye picture needs to be set at an interval that satisfies the following equation with respect to a left-eye picture shown by a certain time (PTS):

$$PTS(\text{for the right eye}) = PTS(\text{for the left eye}) + 1/(\text{the number of frames per second} \times 2).$$

When a frame rate is 24 p, for example, it is indicated that 24 pictures are displayed in a second. Therefore, the interval (display delay) between the left-eye pictures and the corresponding right-eye pictures is 1/48 seconds.

Thus, the right-eye pictures need to be synchronized with the corresponding left-eye pictures with a display delay (1/48 seconds).

Therefore, in the case of multiplexing the left-eye video stream and a right-eye video stream into a transport stream, multiplexing may be performed such that the left-eye pictures are arranged in a vicinity of the corresponding right-eye pictures based on PTSs and DTSs. Here, the PTSs show display times of pictures in each GOP of each of the video streams, and the DTSs show decoding times of pictures in each GOPs of each of the video streams.

When the streams are multiplexed in such way, required left-eye and right-eye pictures can be obtained at a necessary time if a transport stream is read in order from the head.

However, in some cases, playback is performed from a time point other than a time point of the head of the stream because of a skip operation or a time-specifying jumping operation. In such cases, since entry points are written in each of the entry maps in units of GOPs, GOP boundaries between the left-eye pictures and the right-eye pictures need be considered when performing multiplexing.

4. Multiplexing a Left-Eye Video Stream and a Right-Eye Video Stream

The following describes how to perform multiplexing of the left-eye video stream and the right-eye video stream with random access to an AV clip taken into consideration.

Firstly, setting needs to be made such that the GOPs of the left-eye video stream and the GOPs of the right-eye video stream have the same temporal interval. Also, the GOPs of the left-eye video stream need to be in one to one correspondence with the GOPs of the right-eye video stream. In such way, the left-eye video stream can be synchronized with the right-eye video stream in units of GOPs.

Also, since an entry map (PID=0x1011) is set for the left-eye video stream as shown in FIG. 5, each time information piece (PTS) in the entry map shows a playback start time of a head of each GOPs of the left-eye video stream, and each address information piece (SPN) shows an address of a head of packets of each GOP of the left-eye video stream in the AV clip. Since the playback apparatus reads data from a position shown by such address in the AV clip, arrangement needs to be made such that each of the GOPs of the right-eye video stream succeeds the head of the packets that compose each of the corresponding GOPs of left-eye video stream.

Figure 8:
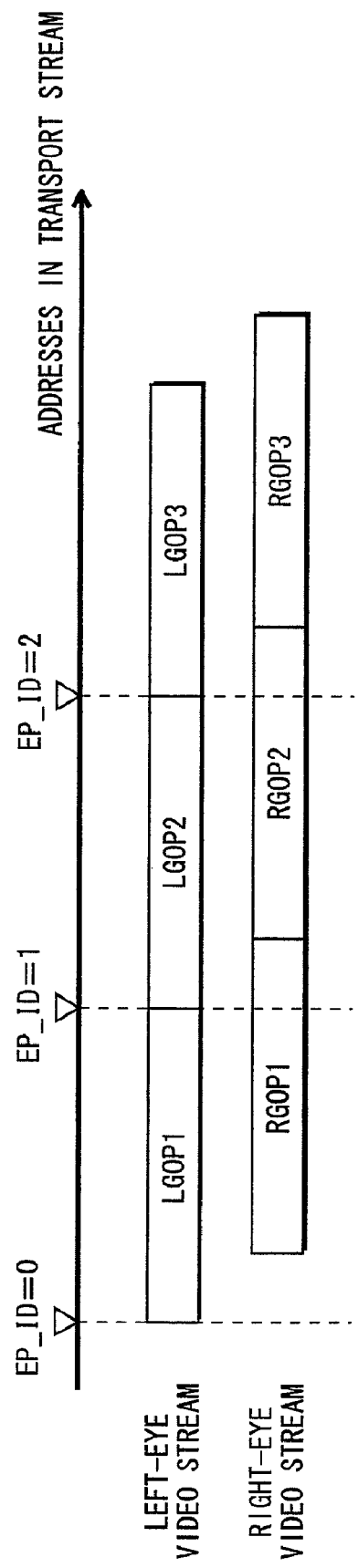
FIG. 8 schematically shows an example of multiplexing of the left-eye video stream and the right-eye video stream.

FIG. 8 schematically shows an example of multiplexing of the left-eye video stream and the right-eye video stream. As shown in FIG. 8, the left-eye video stream and the right-eye video stream are multiplexed in units of the GOPs in a form that GOPs of the left-eye video stream precede the GOPs of the corresponding right-eye video stream.

In such way, when playback starts, for example, from LGOP2 of the left-eye video stream in FIG. 8, RGOP2 of the right-eye stream corresponding to LGOP2 of the left-eye video stream can be read without a problem if the playback starts from a head of packets that compose LGOP2. Therefore, the left-eye video stream and the right-eye video stream can be played back as 3D graphics at such playback start time.

As shown in the above, by adding, when multiplexing is performed, restrictions that (i) GOPs of the left-eye video stream and GOPs of the right-eye video stream have the same temporal interval, and (ii) a head of each GOP of the left-eye video stream always precedes a head of each corresponding GOP of the right-eye video stream, it is ensured that the left-eye video stream and the right-eye video stream can be played back as 3D graphics no matter which time point shown by the entry map the playback starts from.

Figure 9:
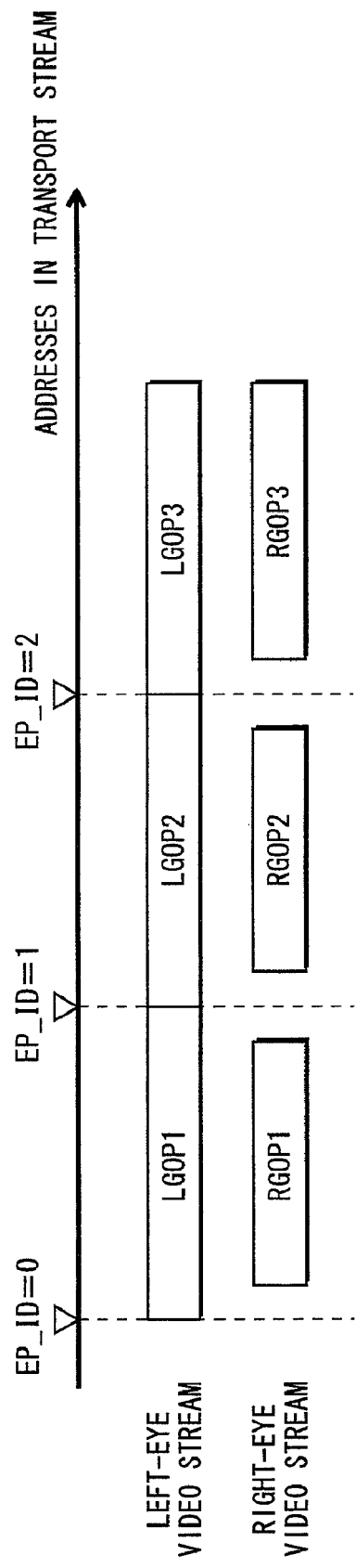
FIG. 9 schematically shows another example of multiplexing of the left-eye video stream and the right-eye video stream.

The following describes another example of multiplexing the left-eye video stream and the right-eye vide stream. FIG. 9 schematically shows another example of multiplexing the left-eye video stream and the right-eye vide stream. FIG. 8 and FIG. 9 are common in that a head of each GOP of the left-eye video stream always precedes a head of each corresponding GOP of the right-eye video stream when multiplexing is performed. However, while there is no restriction on an arrangement of an end position of each GOP for the left eye (left-eye GOP) and an arrangement of an end position of each corresponding GOP for the right eye (right-eye GOP) in FIG. 8, FIG. 9 is different from FIG. 8 in that the right-eye GOP is located between the header packet and the end packet of the corresponding left-eye GOP succeeds in FIG. 9. In such way, even when an AV clip is cut according to GOP boundaries of the left-eye video stream, the AV clip can be cut without cutting GOPs of the right-eye video stream.

Figure 10:
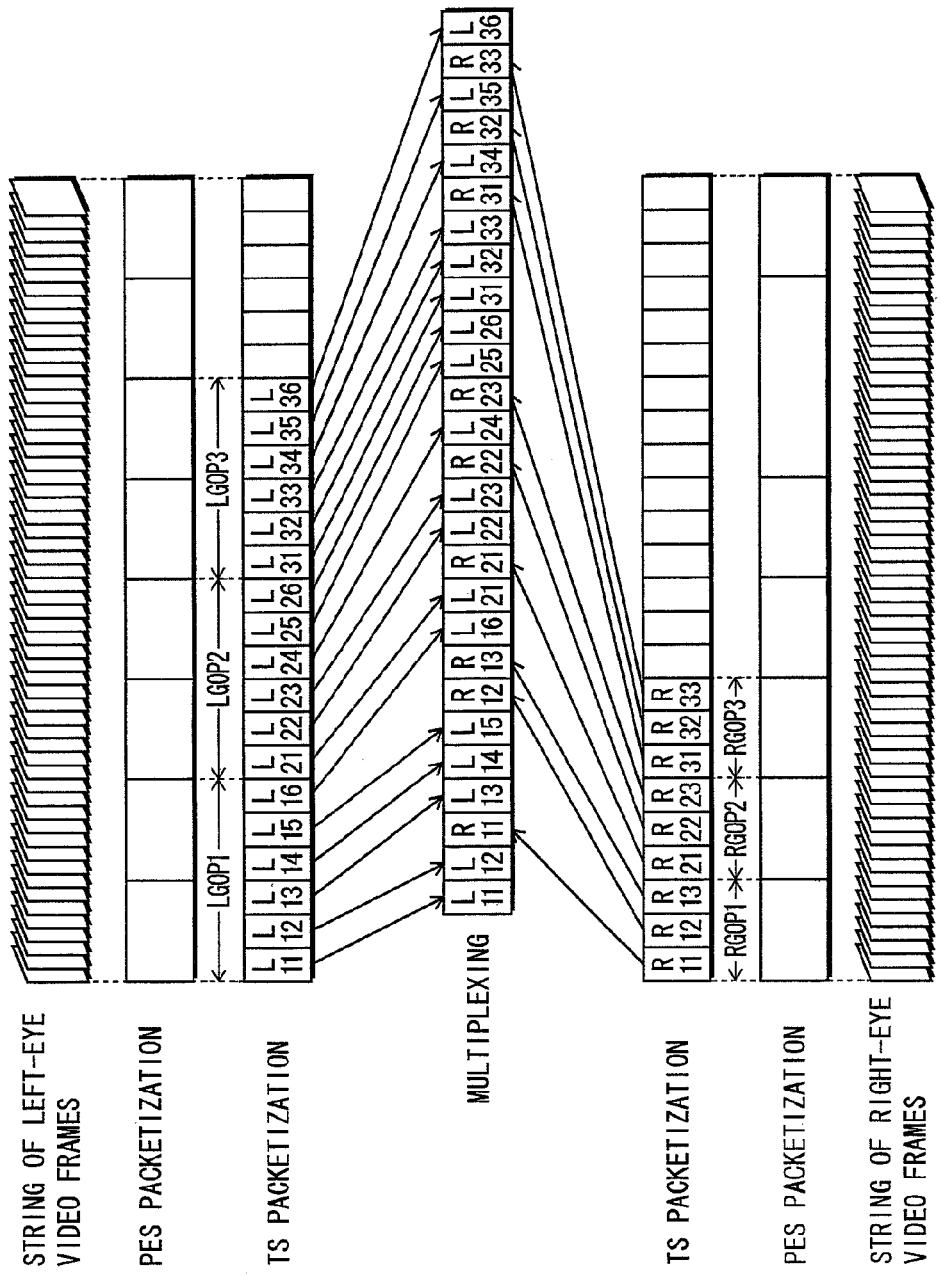
FIG. 10 schematically shows how each of the video streams is multiplexed in the AV clip.

FIG. 10 schematically shows how each video stream is multiplexed in the AV clip when a right-eye GOP is located between a header packet and an end packet of the corresponding left-eye GOP.

Firstly, the left-eye video stream composed of a plurality of video frames is converted into a PES packet string, and the PES packet string is converted into a TS packet string. Similarly, the right-eye video stream composed of a plurality of video frames is converted into a PES packet string, and the PES packet string is converted into a TS packet string.

As shown in FIG. 10, a header packet (L11) of GOPs (LGOP1) of the left-eye video stream is arranged first when the left-eye video stream and the right-eye video stream are multiplexed. Packets (R11, R12 and R13) of a GOP (RGOP1) of the right-eye video stream corresponding to LGOP1 succeed an arrangement position of the packet (L11) of LGOP1, and precede an arrangement position of an end packet (L16) of LGOP1. A header packet (L21) of the next GOP (LGOP2) of the left-eye video stream follows the end packet (L16) of LGOP1. As with the above, packets (R21, R22 and R23) of a GOP (RGOP2) of the right-eye video stream corresponding to LGOP2 precede an end packet (L26) of LGOP2. By multiplexing the left-eye video stream and the right-eye video stream in such way, a digital stream is generated that ensures that GOPs of the right-eye video stream are not cut when the AV clip is cut according to the GOP boundaries of the left-eye video stream.

5. Playback Apparatus

Figure 11:
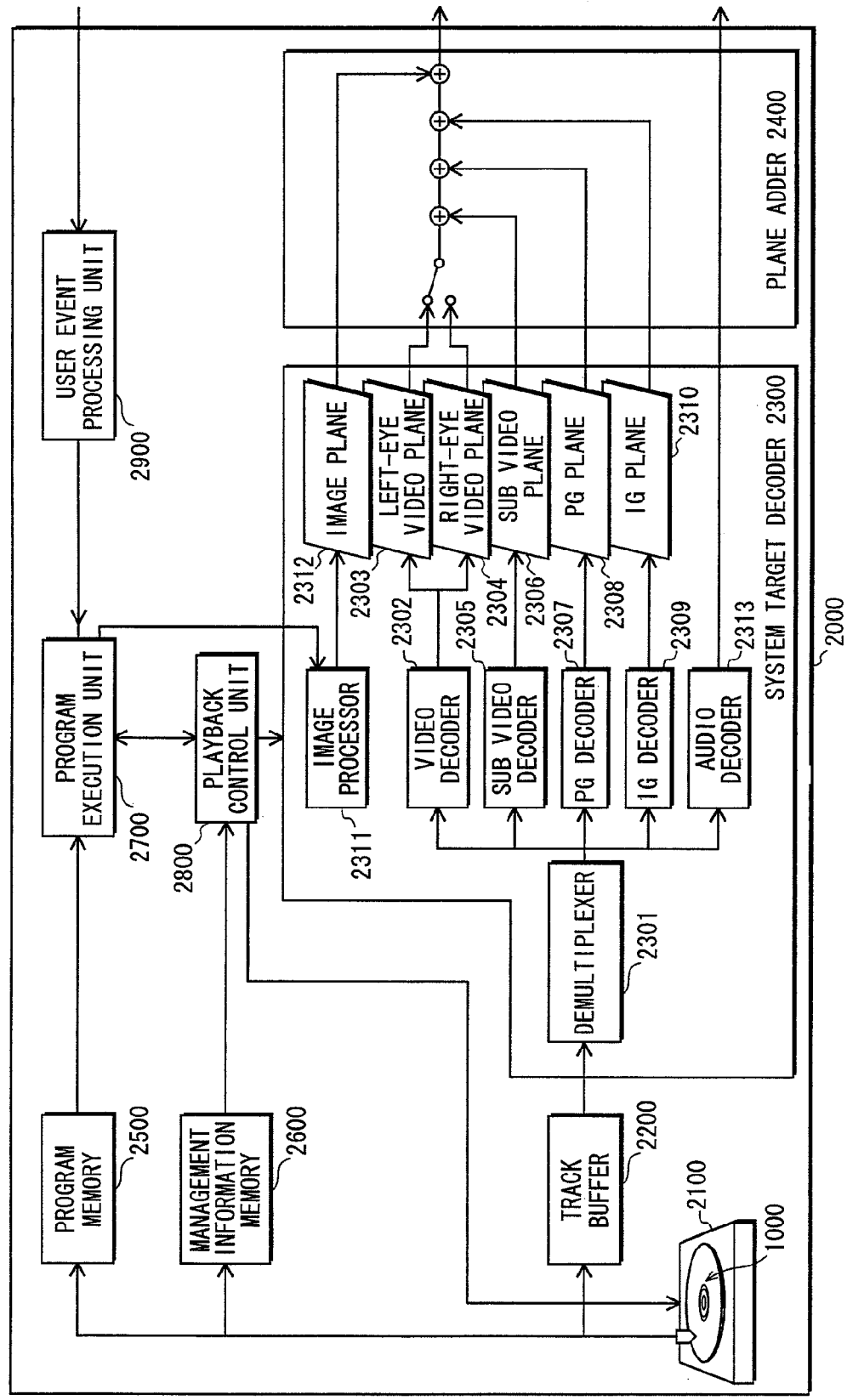
FIG. 11 is a block diagram showing a structure of a playback apparatus 2000.

The following describes a playback apparatus that plays back a BD-ROM 1000 storing 3D graphics. FIG. 11 is a block diagram showing a structure of a playback apparatus 2000. As shown in FIG. 11, the playback apparatus 2000 is composed of a BD-drive 2100, a track buffer 2200, a system target decoder 2300, a plane adder 2400, a program memory 2500, a management information memory 2600, a program execution unit 2700, a playback control unit 2800, and a user event processing unit 2900.

The BD-ROM drive 2100 reads data from the BD-ROM 1000 based on a read request inputted from the playback control unit 2800. The AV clip read from the BD-ROM 1000, management information (an index file, a play list file and a clip information file), a BD program file are transferred to the track buffer 2200, the management information memory 2600 and the program memory 2500, respectively.

The track buffer 2200 is a buffer composed of a memory and the like storing therein AV data clip inputted from the BD-ROM drive 2100.

The system target decoder 2300 performs multiple separation processing on the AV clip stored in the track buffer 2200, and performs decoding processing on streams. The playback control unit 2800 transfers, to the system target decoder 2300, information (a codec type, a stream attribute and the like) included in the AV clip that are necessary for decoding the streams.

The system target decoder 2300 is specifically composed of a demultiplexer 2301, a video decoder 2302, a left-eye video plane 2303, a right-eye video plane 2304, a sub video decoder 2305, a sub video plane 2306, a presentation graphics decoder (PG decoder) 2307, a presentation graphics plane (PG plane) 2308, an interactive graphics plane decoder (IG decoder) 2309, an interactive graphics plane (IG plane) 2310, an image processor 2311, an image plane 2312 and an audio decoder 2313.

The demultiplexer 2301 extracts TS packets stored in the track buffer 2200, and obtains a PES packet from the extracted TS packets. The demultiplexer 2301 outputs the PES packet to one of the video decoder 2302, the sub video decoder 2305, the PG decoder 2307, the IG decoder 2309 and the audio decoder 2313, based on PIDs (packet identifiers) included in TS packets. Specifically, the PES packet obtained from the extracted TS packets is transferred to: the video decoder 2302 if the PIDs included in the TS packets are 0x1011 or 0x1012, the sub video decoder 2305 if the PIDs are 0x1B00, the audio decoder 2313 if the PIDs are 0x1100 or 0x1101, the PG decoder 2307 if the PIDs are 0x1200 or 0x1201, and to the IG decoder 2309 if the PIDs are 0x1400.

Figure 12:
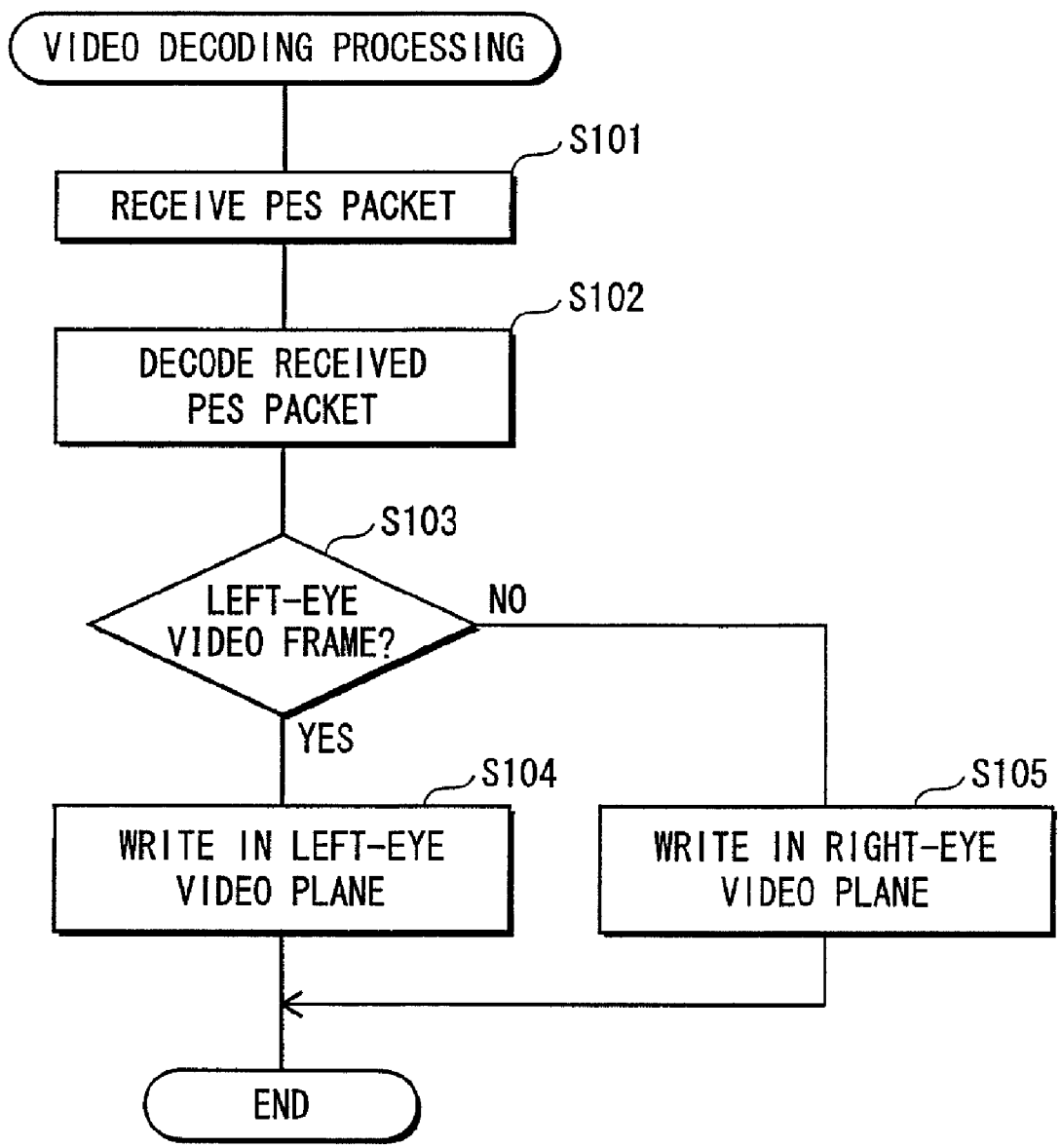
FIG. 12 is a flowchart showing video decoding processing by a video decoder 2302.

The video decoder 2302 decodes the PES packet inputted from the demultiplexer 2301 to obtain uncompressed pictures, and writes the pictures in one of the left-eye video plane 2303 and the right-eye video plane 2304. The following describes an operation of the video decoder 2302. FIG. 12 shows a flowchart showing video decoding processing by the video decoder 2302. Receiving the PES packet from the demultiplexer 2301 (step S101), the video decoder 2302 decodes the received PES packet to obtain uncompressed pictures (step S102).

The video decoder 2302 judges whether the uncompressed pictures compose a left-eye video frame or a right-eye video frame (step S103). Such judgment is made as follows. When, for example, the demultiplexer 2301 transmits the PES packet to the video decoder 2302, a flag showing whether the PES packet is for the left-eye video stream or the right-eye video stream, based on the PIDs included in the TS packets is added; and the video decoder 2302 judges whether the flag shows the PES packet is for the left-eye video stream.

When judging that the uncompressed pictures compose the left-eye video frame (step S103: Yes), the video decoder 2302 writes the pictures in the left-eye video plane 2303 (step S104).

When judging that the uncompressed pictures compose the right-eye video frame (step S103: No), the video decoder 2302 writes the pictures in the right-eye video plane 2304 (step S105).

In FIG. 11, the left-eye video plane 2303 is a plane for storing uncompressed pictures for the left eye. The plane is a memory area for storing, in the playback apparatus, pixel data corresponding to one screen. Resolution in the video plane is 1920×1080, and picture data stored in such video plane is composed of pixel data expressed by a YUV value of 16 bits.

The right-eye video plane 2304 is a plane for storing uncompressed pictures for the right eye.

The video decoder 2302 writes pictures in the left-eye video plane 2303 and the right-eye video plane 2304 at a time shown by a PTS of the video frame.

The sub video decoder 2305 has the same structure as the video decoder 2302, decodes the video frame inputted from the demultiplexer 2301, and writes the uncompressed pictures in the sub video plane 2306 at a time shown by the display time (PTS).

The sub video plane 2306 is a plane for storing uncompressed pictures of sub video.

The PG decoder 2307 decodes a presentation graphics stream inputted from the demultiplexer 2301, and writes uncompressed graphics data in the PG plane 2308 at the display time (PTS).

The PG plane 2308 is a plane for storing graphics data.

The IG decoder 2309 decodes an interactive graphics stream inputted from the demultiplexer 2301, writes the uncompressed graphics data in the IG plane 2310 at a time shown by the display time (PTS).

The IG plane 2310 is a plane for storing graphics data.

The image processor 2311 decodes graphics data (PNG.JPEG) inputted from the program execution unit 2700, and outputs the decoded graphics data to the image plane 2312. Decoding timing of the image plane 2312 is indicated by the program execution unit 2700 when the graphics data is data for menu. The decoding timing of the image plane 2312 is indicated by the playback control unit 2800 when the graphics data is data for subtitles.

The image plane 2312 is a plane for storing graphics data (PNG.JPEG).

The audio decoder 2313 decodes the PES packets inputted from the demultiplexer 2301, and outputs uncompressed audio data.

The plane adder 2400 (i) determines in which of the left-eye video plane 2303 and the right-eye video plane 2304 pictures are written at a time shown by a PTS, and (ii) generates a video signal by superimposing the selected plane, the sub video plane 2306, the PG plane 2308, the IG plane 2310 and the image plane 2312 instantly, and outputs the video signal to a display of TV and the like. The video signal includes a flag showing which of the left-eye picture or a right-eye picture is superimposed.

The program memory 2500 is a memory for storing a BD program file inputted from the BD-ROM drive 2100.

The management information memory 2600 is a memory for storing an index table, management information and play list information inputted from the BD-ROM drive 2100.

The program execution unit 2700 executes a program stored in the BD program file stored in the program memory 2500. Specifically, the program execution unit 2700 (i) instructs the playback control unit 2800 to play back a play list based on the user event inputted from the user event processing unit 2900, and (ii) transfers, to the system decoder 2300, PNG.JPEG for a menu and game graphics.

The playback control unit 2800 has functions of controlling playback of the AV clip by controlling the BD-ROM drive 2100 and the system target decoder 2300. For example, the playback control unit 2800 controls the playback processing of the AV clip with reference to play list information stored in the management information memory 2600, based on the playback instruction inputted from the program execution unit 2700. Also, in the case of random access, the playback control unit 2800 specifies a start position of a GOP corresponding to time information registered in entry maps stored in the management information memory 2600, and instructs the BD-ROM drive 2100 to start reading from the start position. In such way, processing can be performed efficiently without analyzing the AV clip. Furthermore, the playback control unit 2800 performs acquisition of information on a state and setting of the state.

In accordance with a key operation performed on a remote control or a front panel of a playback apparatus, the user event processing unit 2900 outputs, to the program execution unit 2700, a user event showing such operation.

This concludes the structure of the playback apparatus 2000.

6. Structure of Viewing 3D Graphics at Home

Figure 13:
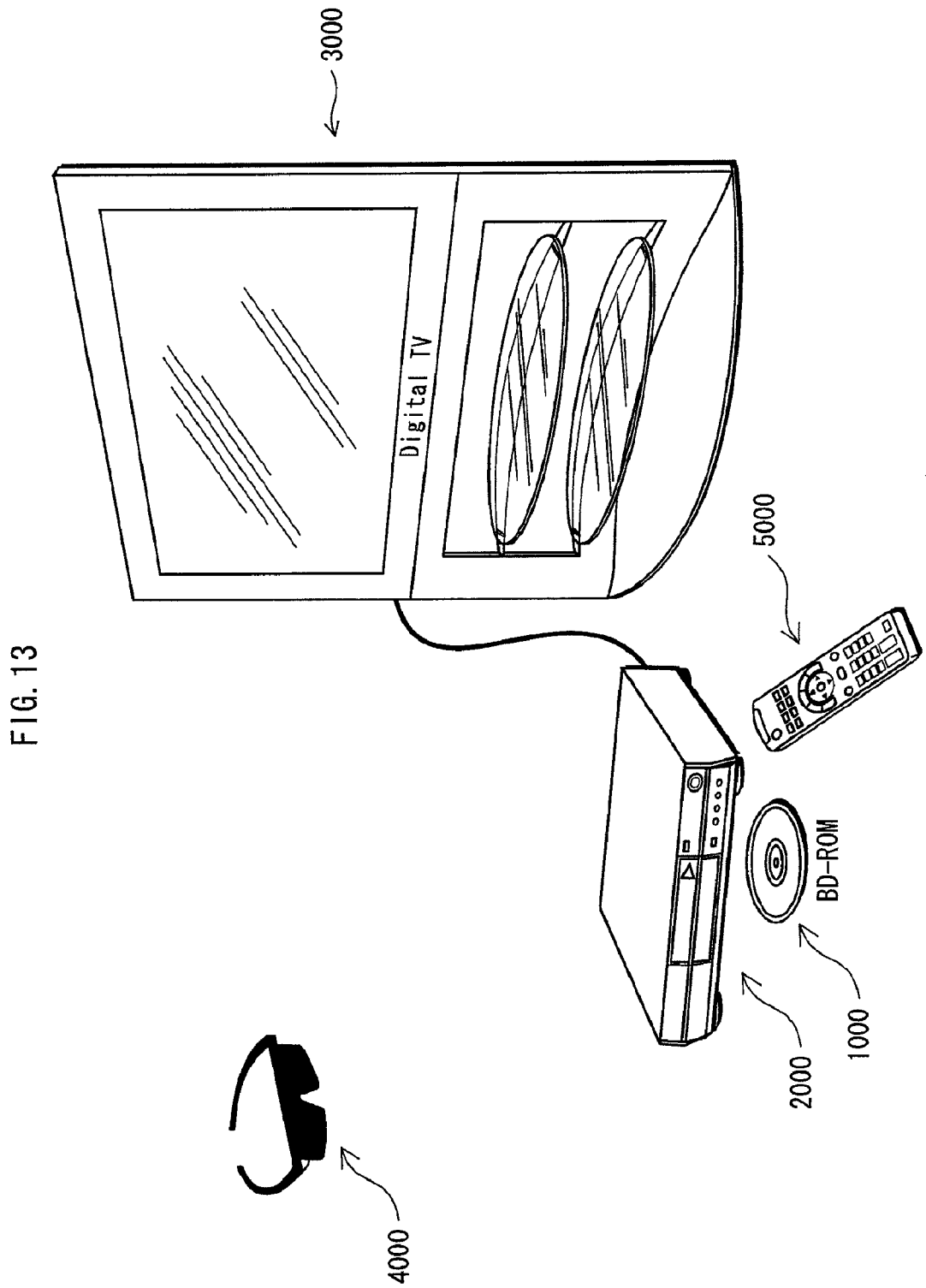
FIG. 13 shows a structure of a home theater system.

The following describes a structure of viewing 3D graphics at home. In order for the user to view 3D graphics at home, a display capable of displaying 3D graphics outputted from the playback apparatus, and glasses for stereoscopic viewing (stereoscopic glasses) are necessary in addition to the above-stated BD-ROM and the playback apparatus 2000 that plays back the BD-ROM. FIG. 13 shows a home system composed of the BD-ROM 1000, the playback apparatus 2000, the display 3000, stereoscopic glasses 4000, and a remote control 5000.

The playback apparatus 2000 and the display are connected to each other via, for example, a HDMI (High-Definition Multimedia Interface) cable.

The display 3000 displays a video signal inputted from the playback apparatus 2000 according to time division. Since the playback apparatus 2000 inputs left-eye pictures and right-eye pictures alternately, the display 3000 displays the left-eye pictures and the right-eye pictures alternately in a time axis direction.

The display 3000 is different from a display for displaying 2D graphics in that the display 3000 needs to be capable of quickly switching a screen in order to alternately display left-eye pictures and right-eye pictures compared to such display for 2D graphics. For example, while most movies are shot using 24p (24 frames in a second), 48 frames need to be rewritten in a second in the case of the 3D graphics since 24 frames for the left-eye video and 24 frames for the right-eye video need to be alternately displayed in a second. Also, the display capable of playing back 3D graphics has another feature in which setting is made such that edge enhancement processing performed in an existing consumer TV is not performed while the 3D graphics is displayed. This is because, in viewing 3D graphics, edge positions of the left-eye pictures and the right-eye pictures are important, and stereoscopic viewing cannot be provided properly if imbalance of the left-eye pictures and the right-eye pictures arises because the edge lines become thicker or thinner due to the edge enhancement and the like.

Also, the display 3000 transmits, to the stereoscopic glasses 4000, a control signal showing which of the left-eye picture and the right-eye picture is displayed on the display, based on a flag included in a video signal inputted via the HDMI cable.

As described in the principles of stereoscopic viewing in the first embodiment, the stereoscopic glasses 4000 are used in viewing 3D graphics in the successive separation method, and are special glasses including liquid crystal shutters. The stereoscopic glasses 4000 switch, based on the control signal, each of the liquid crystal shutter for the left eye and the liquid crystal shutter for the right eye between a light-transmitting state and a light-blocking state. Specifically, when receiving, from the display, a control signal showing that a left-eye picture is being displayed, the stereoscopic glasses bring the liquid crystal shutter for the left eye into the light-transmitting state, and the crystal liquid shutter for the right eye into the light-blocking state. When receiving a control signal showing that a right-eye picture is being displayed, the stereoscopic glasses bring the liquid crystal shutter for the right eye into the light-transmitting state, and the crystal liquid shutter for the left eye into the light-blocking state.

According to the above-stated embodiment, it is possible, even when playback starts from an arbitrary PTS on the time axis of the digital stream, to reliably allow the user to perform stereoscopic viewing of moving pictures. This is because GOPs of the left-eye video stream and the corresponding GOPs of the right-eye video stream in GOP pair regions whose beginning are indicated by the SPNs corresponding to the PTSs in the recording area of the digital stream on the time axis.

Second Embodiment

The present embodiment describes the recording apparatus and the recording method pertaining to the present invention.

The recording medium (i) is located in a production studio for distributing film contents, (ii) generates (a) a digital stream which has been compressed and encoded according to the MPEG standards, and (b) a scenario on which how a movie title is played back is written, and (iii) generates a volume image for a BD-ROM including such data pieces. The recording medium generates a recording medium described in the first embodiment.

FIG. 14 is a block diagram showing an internal structure of the recording apparatus 40. As shown in the present figure, the recording apparatus 40 is composed of a video encoder 41, a material generating unit 42, a scenario generating unit 43, a BD program generating unit 44, a multiplexing processing unit 45 and a format processing unit 46.

The video encoder 41 encodes images such as uncompressed bitmaps of left-eye pictures and images such as uncompressed bitmaps of right-eye pictures according to compressing method such as MPEG4-AVC, MPEG2 and the like, and generates a left-eye video stream and a right-eye video stream. In that case, setting is made such that GOPs of the left-eye video stream and GOPs of the right-eye video stream have the same temporal interval.

The following describes a method of efficiently generating an elementary stream of 3D video.

When compressing video for package media such as a DVD and a BD-ROM, in general video compressing technology, compression rate is increased by performing compression making use of similarities between previous and/or subsequent pictures. At this time, an enormous amount of time is needed for encoding in order to search for similar parts in the previous and/or subsequent images. FIGS. 15A, 15B and 15C show how to efficiently generate an elementary stream of 3D video. FIG. 15A shows a left-eye picture at a certain time point, and FIG. 15B shows the left-eye picture at a time point immediately after the time point of the picture shown in FIG. 15A. The video encoder 41 searches, in the left-eye picture shown in FIG. 15B, for a cube or a circle exists in the left-eye picture shown in FIG. 15A. At this time, it is necessary to perform searching in the whole screen shown by FIG. 15B in order to perform searching in the largest range at the time of encoding the left-eye pictures. In the case of a general encoding process, the right-eye pictures are encoded by performing the same procedures as the case of encoding the left-eye pictures. That is, it is necessary to perform searching in the whole screen as shown in FIG. 15B.

As evident from the above, it takes twice as much compressing time in encoding 2D video as in encoding 3D video (a string of left-eye video frames and a string of right-eye video frames) since it is necessary to compress each string of video frames separately.

The video encoder 41 writes, in the table, to which direction and how far each search target moves at the time of encoding the left-eye video. This shortens encoding time since, by referring to the table, it is not necessary to perform searching in the whole screen in the case of encoding the right-eye pictures which are very similar to the left-eye pictures. FIG. 15C shows a table showing to which direction and how far each search target moves. In the case of encoding the right-eye pictures, a search range can be narrowed down by referring to the table shown in FIG. 15C.

Note that although a description is given using figures such as the cube and the circle in order to make the description simple, a moving direction and a distance may be recorded, at the time of actual encoding, for each of rectangle and square areas (8×8, 16×16 and the like) as with the case of the geometric figures.

Back in FIG. 14, the material generating unit 42 generates streams such as an audio stream, a presentation graphics stream, an interactive graphics stream and the like. More specifically, the material generating unit 42 generates an audio stream by encoding uncompressed Linear PCM audio or the like according to a compressing method such as the AC3 method and the like.

Also, the material generating unit 42 generates a presentation graphics stream which is a format of a subtitle stream complying with the BD-ROM standard, based on a subtitle information file including subtitling effects such as a subtitle image, display timing, fade-in/fade-out and the like.

Furthermore, the material generating unit 42 generates an interactive graphics stream which is a format of a menu screen complying with the BD-ROM standard, based on bit-map images used for menus, and a menu file on which transition and the display effect of buttons arranged on the menu are written.

The scenario generating unit 43 generates a scenario, using a format complying with the BD-ROM standard, according to information on each stream generated in the material generating unit 42, and the user operation. The scenario is a file such as an index file, a movie object file, a play list file or the like.

Also, the scenario generating unit 43 generates a parameter file for realizing multiplexing processing. In the parameter file, which stream each AV clip is composed of is written. Each file such as an index file, a movie object file, a play list file and the like to be generated has the same data structure the structure described in the first embodiment.

The BD program generating unit 44 generates a program of a BD program. The BD program generating unit 44 generates (i) source codes of the BD program, according to the request from a user, via a user interface such as GUI or the like, and (ii) a BD program file.

The multiplexing processing unit 45 multiplexes a plurality of streams such as a left-eye video stream, aright-eye video stream, an audio stream, a presentation graphics stream, an interactive graphics stream and the like that are written on the BD-ROM scenario data to generate an AV clip according to the MPEG2-TS method. In that case, a left-eye video stream and a right-eye video stream are multiplexed in units of GOPs in a manner that a head of GOPs of the left-eye video stream precedes a corresponding GOP of the right-eye video stream.

Also, in the case of creating an AV clip, a clip information file which makes a pair with the AV clip is generated simultaneously. Generation of the clip information file by the multiplexing processing unit 45 is performed by the following method. The multiplexing processing unit 45 generates entry maps in each of which a storing position of a header packet of each GOP of the left-eye video stream is in correspondence with a display time of the header packet of each of the GOPs, and generates a clip information file by pairing, in one to one correspondence, the generated entry maps with attribute information showing audio attributes, video attributes and the like of each stream included in the AV clip. The structure of the clip information file has the same data structure as the structure described in the first embodiment.

The format processing unit 46 (i) arranges: according to the format complying with the BD-ROM standard, the BD-ROM scenario data generated in the scenario generating unit 43; the BD program file generated in the BD program generating unit 44; and the AV clip and the clip information file generated in the multiplexing processing unit 45, and (ii) generates a disc image according to the UDF format which is a file system complying with the BD-ROM standard. The format processing unit 46 converts the generated disc image into data for BD-ROM pressing, and performs a pressing step on this data, thereby manufacturing a BD-ROM.

Third Embodiment

The present embodiment describes a case in which 2D pictures and 3D pictures exist together on the BD disc. If all the pictures of movie content recorded on the BD-ROM disc are either 3D or 2D, the user can choose either to wear or not to wear the above-mentioned glasses for stereovision according to discs. However, when 2D pictures and 3D pictures exist together on one disc, the user needs to wear or take off the glasses with certain timing.

From the perspective of the user, it is very difficult to see when to wear and take off the glasses if, without notification, 2D pictures suddenly switch to 3D pictures, or the 3D pictures suddenly switch to the 2D pictures, on the other hand.

In order to solve this, a 3D flag showing whether a title is 2D video or 3D video is provided with each title. When a title changes, it is judged whether the changed title is 2D video or 3D video based on the 3D flags. Then the user is notified of the result of the judgment. FIG. 16 shows a structure of an index table including 3D flags. As shown in FIG. 16, a 3D flag showing whether video in each title is 2D or 3D is provided with each title. Switching between titles is performed by a user operation using a remote control, a command or the like. The playback apparatus can notify the user of timing of wearing or taking off the stereoscopic glasses by an OSD (On Screen Display), an audio assist or the like by referring to the above-mentioned 3D flags corresponding to the respective titles at the time of transition of the titles. This means that 2D video and 3D video do not exist together in one title. From the perspective of those creating commercial discs, there is a merit that it is possible to have the BD-ROM player prompt the user to wear or take off the glasses by clearly dividing pictures into 2D pictures and 3D pictures for each title.

Note that although a description is given, in the above, of the case where a flag showing whether pictures are 2D or 3D is provided with each corresponding title, a 3D flag may be provided with each playlist, each play item or each AV stream.

Supplementary Explanations

Although a description is given of a recording medium pertaining to the present invention in the above based on the embodiments, it is needless to say that the present invention is not limited to the above-stated embodiments.

(Modification 1)

In the first embodiment, the left-eye video stream and the right-eye video stream are multiplexed into one digital stream. However, the modification 1 describes a case in which the left-eye video stream and the right-eye video stream are not multiplexed, and are recorded as separate digital streams in the recording medium.

Figure 17:
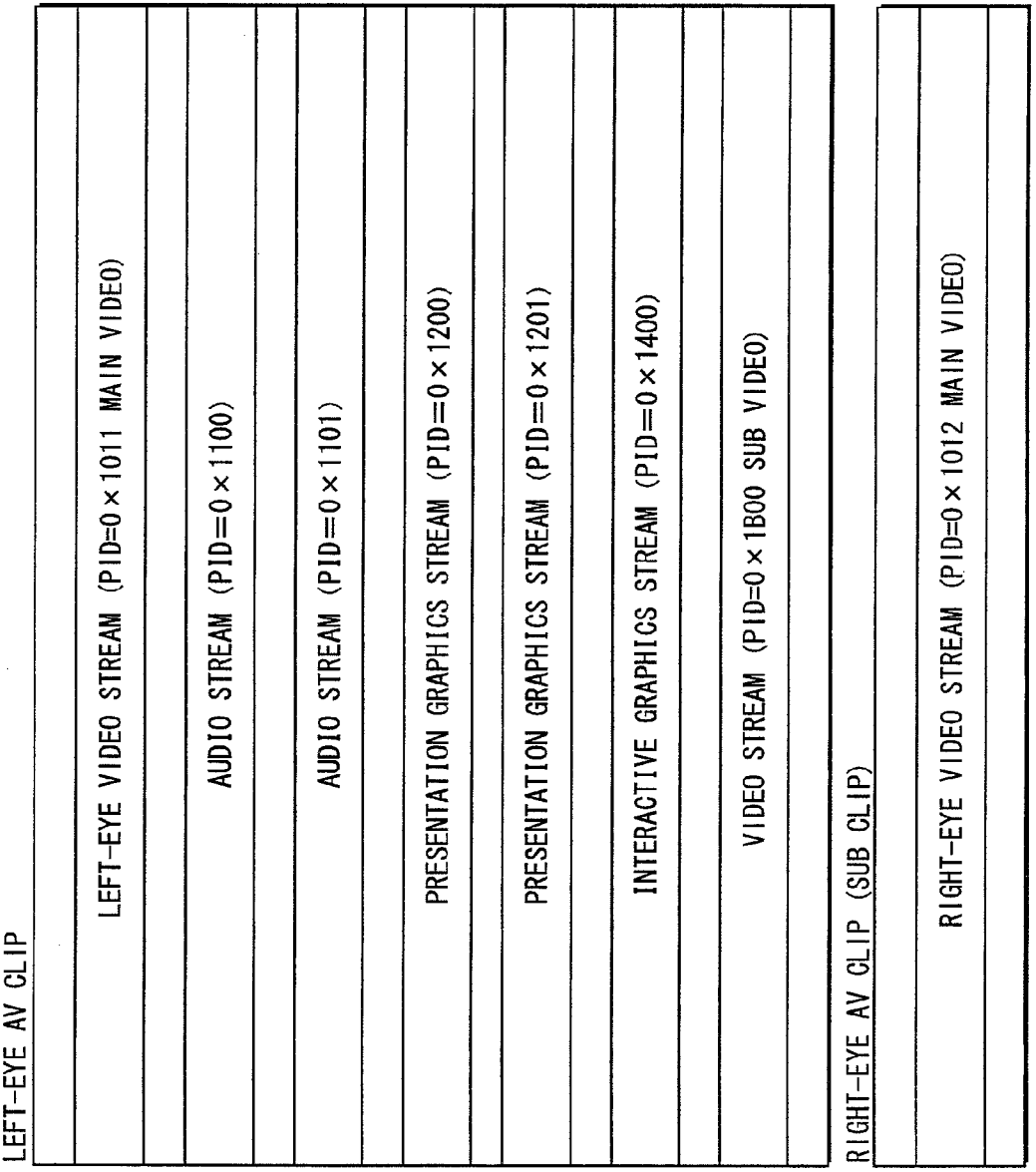
FIG. 17 shows an example of a structure of an AV clip stored in a stream directory.

Firstly, the following describes an AV clip when the left-eye video stream and the right-eye video stream are recorded as separate digital streams in the recording medium. FIG. 17 shows an example of structures of an AV clip stored in a STREAM directory.

An AV clip for the left eye (left-eye AV clip) is the same as the AV clip shown in FIG. 3, except that the left-eye AV clip does not include the right-eye video stream in the present modification. The left-eye video stream is stored in the left-eye AV clip. The left-eye video stream (main video) is played back: as 2D video when played back in a playback apparatus that plays 2D video; and as 3D video when played back in a playback apparatus capable of playing back 3D video.

The right-eye video stream is stored in an AV clip for the right eye (sub clip). The right-eye video stream is played back, as right-eye video, together with the left-eye video stream when 3D video is played back in the playback apparatus capable of playing back the 3D video.

The following describes a structure of a play list when the left-eye video stream and the right-eye video stream are recorded as separate digital streams in the recording medium. The play list information has one or more sub play item (Sub PI) information pieces in addition to a main path which is a playback path of a series of play item information pieces. A playback path of the series of sub play items which is played back in synchronization with the main path is defined as a sub path. Each of the sub play item information pieces shows a playback section of a sub clip. A playback section of each of the sub play item information pieces is shown on the same time axis as the main path.

Figure 18:
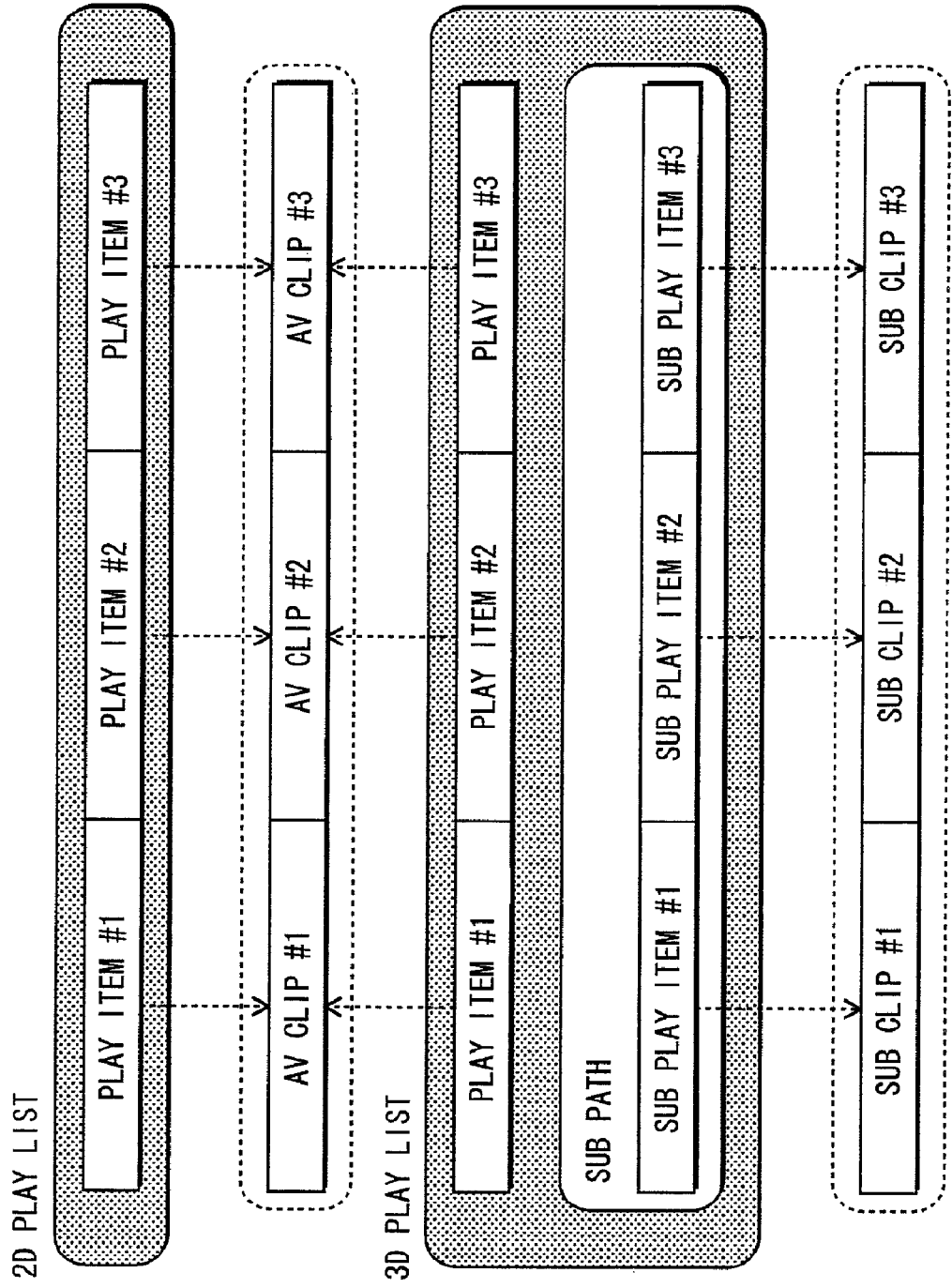
FIG. 18 shows a structure of a play list when the left-eye video stream and the right-eye video stream are recorded as separate digital streams.

FIG. 18 shows a structure of the play list when a left-eye video stream and a right-eye video stream are recorded as separate digital streams. 2D play list information is play list information when the left-eye video stream is played back as 2D video, and 3D play list information is play list information when the left-eye video stream and the right-eye video stream are played back as 3D video. As shown in FIG. 18, a main path of each of the 2D play list information and the 3D play list information refers to the AV clip storing therein the left-eye video stream. The 3D play list information has a sub path in addition to the main path. The sub path refers to a sub clip storing therein the right-eye video stream, and is set so as to be synchronized with the main path on the time axis. With such structure, the 2D play list information and the 3D play list information can share the AV clip storing therein the left-eye video stream. Also, in the 3D play list information, the left-eye video and the right-eye video can be synchronized with each other on the time axis.

The following describes a clip information file when the left-eye video stream and the right-eye video stream are recorded as separate digital streams.

Since the left-eye video stream and the right-eye video stream are separate digital streams, a clip information file exists for each of the digital video streams. Basically, both of the clip information files have the same structure as the clip information file described in the first embodiment. Therefore, an entry map is set for the right-eye video stream, too. In the entry map for the right eye (right-eye entry map) are written entry map header information and table information showing pairs each of which is composed of (i) a PTS showing a display time of a head of each of GOPs that compose the right-eye video stream and (ii) a SPN showing a start position of each of the GOPs in the sub clip. In each entry point in the table information is registered a picture of the right-eye video stream in the sub clip. The picture of the right-eye video stream in the sub clip has a PTS which is a value obtained by adding, to a display delay of ($\frac{1}{48}$) seconds, a PTS specified by each entry point of the left-eye video stream in the AV clip. This enables the playback apparatus, when a certain time is specified, to obtain start addresses of the GOPs in the right-eye video stream and the left-eye video stream, corresponding to the specified time.

The following describes the physical file arrangement on the BD-ROM. The AV clip storing therein the left-eye video stream and the sub clip storing therein the right-eye video stream are divided into extents (e.g. GOP units), and arranged in an interleave manner. GOPs of the left-eye video stream and GOPs of the right-eye video stream have the same temporal interval. Also, a preceding flag is set for the entry map header information of the entry map, for example. Here, the preceding flag shows which of a GOP of the left-eye video stream and the corresponding GOP of the right-eye video stream precedes. This enables the playback apparatus to refer to the preceding flag to indicate, to the BD-ROM, which GOP of the left-eye video stream and the corresponding GOP of the right-eye video stream should be read first. That is, it is possible to start reading from the GOP of the video stream indicated by the preceding flag.

Therefore, even if the left-eye video stream and the right-eye video stream are not multiplexed, and are recorded as separate digital streams, the GOP of the left-eye video stream and the corresponding GOP of the right-eye video stream are located at the playback start position onwards indicated by the playback apparatus. Therefore, it is possible to reliably allow the user to perform the stereoscopic viewing of the moving pictures.

(Modification 2)

Although the 3D play list information has one sub path in addition to the main path in the modification 1, a modification 2 describes a case in which the 3D play list information includes a plurality of sub paths.

Figure 19B:
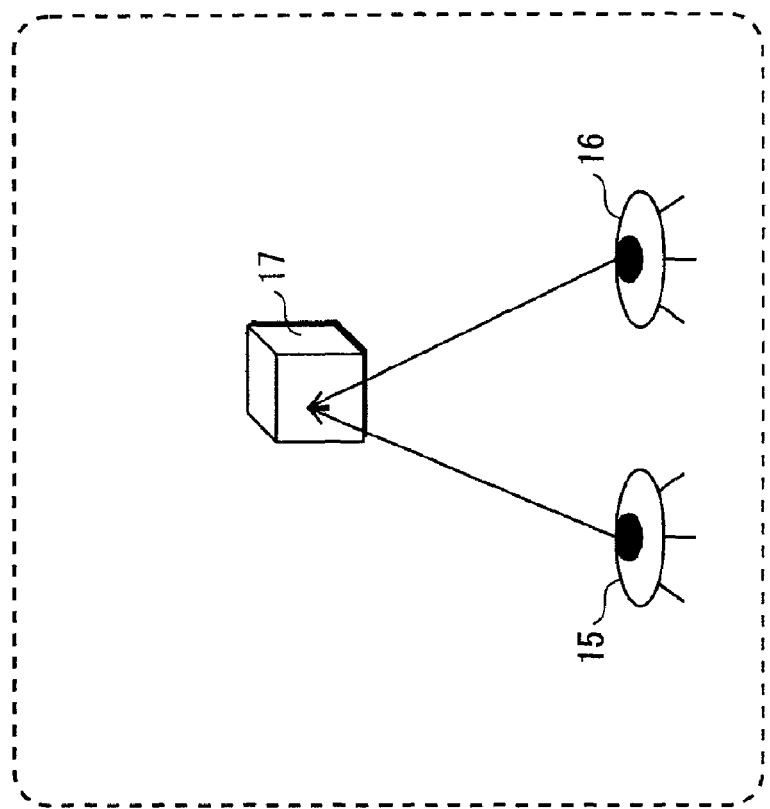
FIGS. 19A and 19B show a difference between a focal point of the eyes when the user actually looks at an object and a focal point of the eyes when the user performs stereoscopic viewing.
Figure 19A:
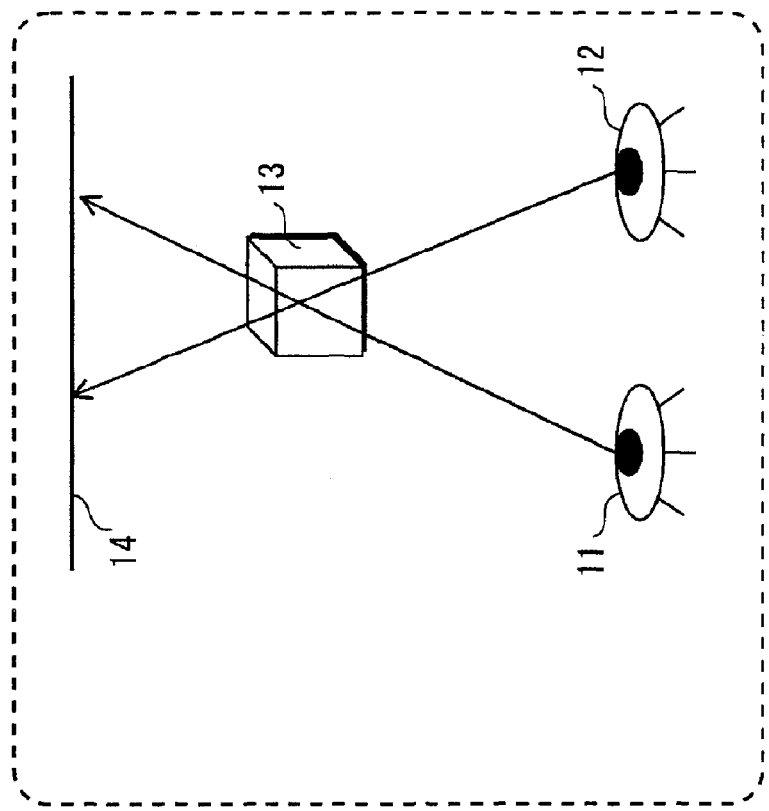

Firstly, the following describes what makes the user feel uncomfortable when performing stereoscopic viewing with use of parallax video. FIGS. 19A and 19B show a difference between focal points of eyes when actually looking at an object and focal points of eyes when performing stereoscopic viewing. FIG. 19B shows how the user actually looks at the object. As shown in FIG. 19B, a left eye 15 and a right eye 16 focus on a position of an object 17. That is, for the user observing the object 17, a position in which the user focuses his/her eyes toward and a position in an empty space in which the user recognizes the object are the same.

On the other hand, FIG. 19A shows how the user performs stereoscopic viewing by parallax video. While a left eye 11 and a right eye 12 focus on a display 14, the image 13 viewed stereoscopically is recognized in the brain in a manner that an image is formed in a point at the interception of lines of vision from both of the eyes to the display when the user looks at the display with both of the eyes. That is, while both of the eyes focus on the display 14, a position in which the user recognizes the 3D object 13 is a position which is popped out from the display, and such difference between a focus position and an object recognizing position causes a sense of discomfort and tiredness when the user recognizes 3D graphics using parallax video.

Also, in general, it is known that the sense of discomfort and the tiredness increase as a difference between (i) a position in which eyes are actually focused (display position) and (ii) a position in which the user recognizes an object as a 3D object in the brain becomes larger.

One way of realizing a 3D imagery using the parallax video with small burden imposed on the user is to store, in the recording medium, a plurality of right-eye video streams each having a different pop-out distance (an angle of an object) as separate AV clips, and to let the user select a desirable distance. That is, two AV clips are prepared, and the user can choose an appropriate AV clip. Here, one of the AV clips is for users who are used to viewing 3D video, or users who want to enjoy realistic sensation by observing more popped out 3D object, and another one of the AV clips is for users who are not used to viewing 3D graphics, and is an AV clip in which discomfort caused when the users view the 3D images is reduced by suppressing the pop-out distance from the display.

Figure 20:
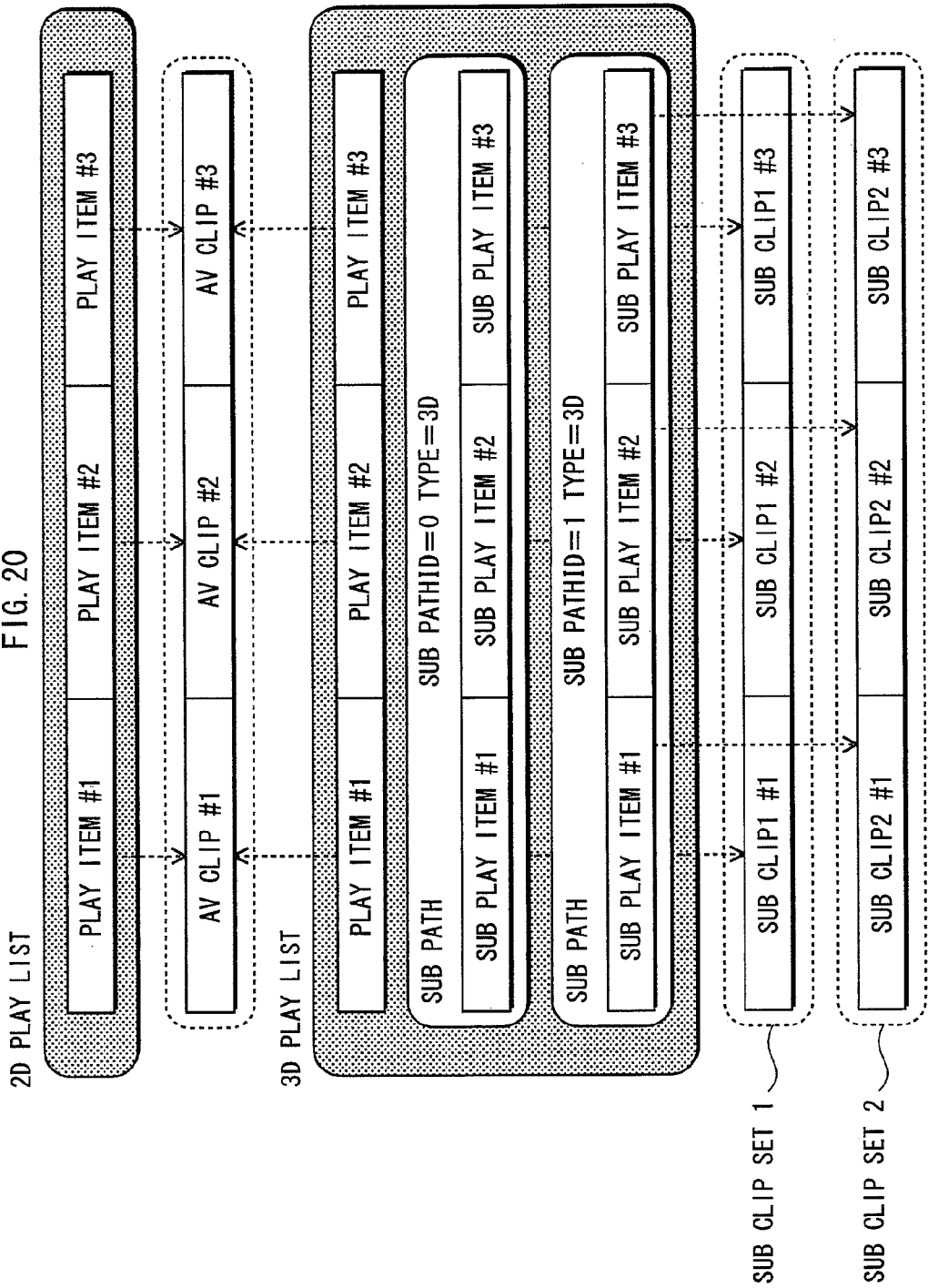
FIG. 20 shows play list information when a plurality of sub paths exist.

FIG. 20 shows play list information when a plurality of sub paths exist. The play list information shown in FIG. 20 refers to a sub clip set 1 and a sub clip set 2. Each of the sub clip sets stores therein a right-eye video stream though the right-eye video streams having different angles of an object (pop-out distances). Each of the sub paths is synchronized with a main path, and is provided with an ID according to the order of being registered in the play list information. Such IDs are used, as sub path IDs, for distinguishing between the sub paths.

A sub path having a sub path ID of "0" refers to the sub clip set 1, and a sub path having a sub path ID of "1" refers to the sub clip set 2. The 3D play list information includes the plurality of sub clips having different pop-out levels, and switching is performed between sub paths that are played back in synchronization with a main path storing therein the left-eye video stream, based on a size of a display screen and a user operation. In such way, stereoscopic viewing can be performed using parallax video which the user feels conformable with.

(Modification 3)

The modification 2 describes the case in which the 3D play list information includes the plurality of sub paths. The present modification describes a case in which audio data, a subtitle and a menu are combined with each of the sub clips.

Figure 21:
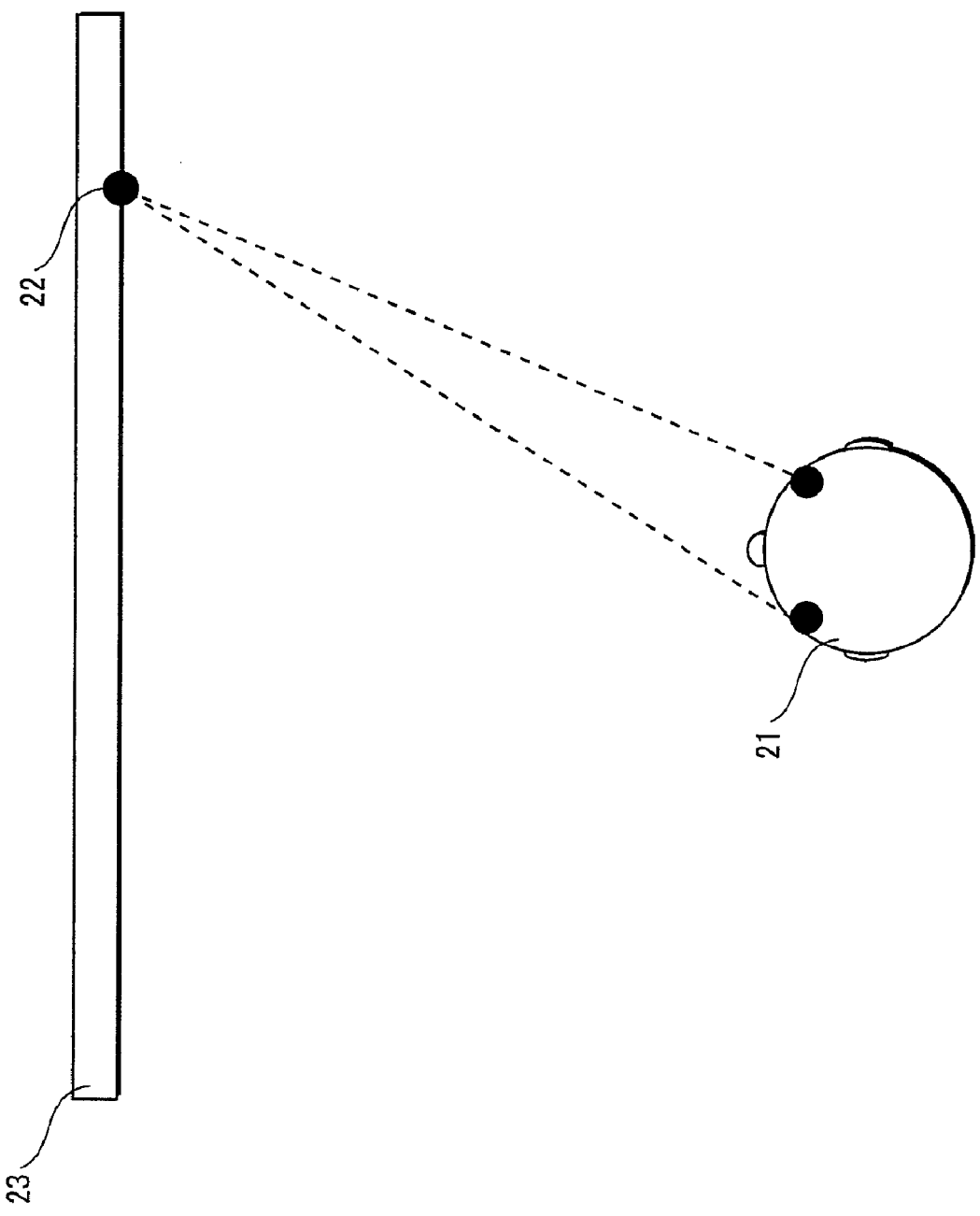
FIG. 21 shows how the user views an object displayed on a display at the time of playing back 2D graphics.

FIG. 21 shows how a user 21 views an object 22 displayed on a display 23 when 2D graphics is played back. At this time, when sound is emitted from the object 22, in most of the movies, realistic sensation is created by a combination of video and audio in order to let the user feel as if the sound were emitted from the position of the object 22 by (i) adjusting phase of sound and sound pressure emitted from a plurality of loudspeakers, and (ii) localizing the sound in a manner that the sound seems to be emitted from the position of the object 22.

Figure 22:
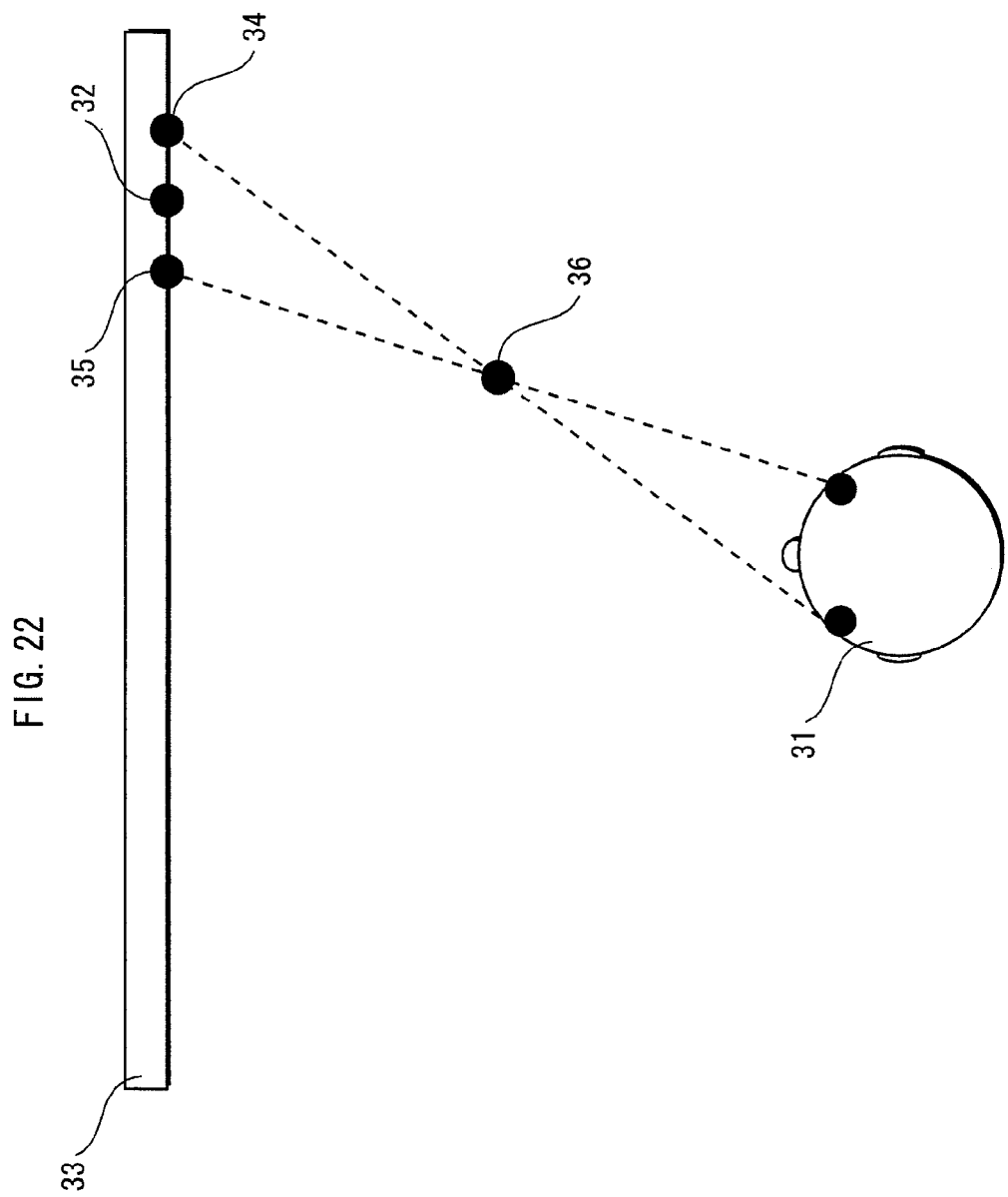
FIG. 22 shows how the object appears to pop out towards the user from the display at the time of playing back 3D graphics.

On the other hand, FIG. 22 shows how the same object appears to pop out towards the side of a user 31 from a display 33 when 3D video is played back. The object is rendered (i) in a position 34 in the left-eye video stream, and (ii) in a position 35 in the right-eye video stream. In such way, the user 31 recognizes the object as if the object were in a position 36 in empty space, and appears to pop out. At this time, if sound emitted from the object is localized in the position 32 using the same sound used in the case of 2D graphics, the sound of the object sounds to the user as if the sound of the object were emitted from the position 32 although the user recognizes that the object is in the position 36.

In order to solve the above-stated problem, in order for the user to hear sound from the position in which the user recognizes the object, audio data pieces are stored in one to one correspondence with a plurality of right-eye video streams in which angles from which objects are looked at are different.

Furthermore, in addition to the audio data pieces, subtitles and menus are stored in one to one correspondence with the right-eye video streams in the same manner. Subtitles and menus corresponding to the right-eye video streams having different pop-out levels (levels showing how far objects pop out) can be displayed by storing combinations of the right-eye video streams and corresponding subtitles and menus having different pop-out levels (which do not hurt the front and back relationship between video and subtitles or menus) according to the pop-out levels of parallax video pieces. This makes it possible to increase the realistic sensation.

FIG. 23 shows a table in which sub clips are in one to one correspondence with audio data pieces, subtitles and menus. As shown in FIG. 23, by holding, in a play list, a table on which audio data pieces corresponding to the sub clips are written, the corresponding audio data pieces can be switched according to the switching of the sub clips.

Note that instead of the above-stated method of increasing the realistic sensation and sense of localization of sound emitted from the object displayed in a 3D manner by preparing audio data pieces corresponding to the respective sub clips, the following alternate method of localizing the audio pieces on the corresponding sub clips is possible: (i) sound that does not contribute to the realistic sensation of the 3D graphics (e.g. background sound) is stored, in an AV clip, as a first audio stream, (ii) only another sound that is emitted from a specific object or a specific character in a screen is stored, in the AV clip, as a second audio stream, and (iii) the first audio stream and the second audio stream are played back simultaneously, while being mixed. This contributes to reduction of data amount when a plurality of audio streams are stored since audio compressing method having higher compression rate can be used by storing, as the second audio stream, comparatively simple sound such as conversation, hum of flies and the like.

(1) In the embodiment 1 described in the above, the AV clip has an entry map relating to the left-eye video stream, and the positions of the respective GOPs of the left-eye video stream precede the positions of corresponding GOPs of the right-eye video stream. However, the AV clip may have an entry map relating to the right-eye video stream, and the positions of the respective GOPs of the right-eye video stream may precede the positions of corresponding GOPs of the left-eye video stream.

(2) In the embodiment 1 described in the above, the playback apparatus includes the left-eye video plane and the right-eye video plane. However, the playback apparatus may have only one video plane. In this case, the playback apparatus writes the left-eye pictures and right-eye pictures alternately in the video plane.

Also, although the playback apparatus has one video decoder, the playback apparatus may have two video decoders; one for the left eye and the other for the right eye. In this case, the demultiplexer outputs PES packets to either the video decoder for the left eye or the video decoder for the right eye, based on the PIDs included in the TS packets.

(3) In the embodiment 1 described in the above, each PTS for the right-eye picture is equal to PTS (for the left eye)+1/(the number of frames per second×2) with respect to a corresponding left-eye picture shown by a certain time (PTS). However, the PTSs of the right eye pictures can be set at any interval as long as each of the PTSs of the right eye pictures is between a corresponding left-eye picture and the next left eye picture.

(4) In the embodiment 1 described in the above, the AV clip has entry maps relating to the left-eye video stream. However, the AV clip may have an entry map of the left-eye video stream and an entry map of the right-eye video stream. In table information of the right-eye entry maps, a PTS is set for each entry point. Here, each of the PTSs is a value obtained by adding, to a display delay (1/48), a PTS specified by an entry point of the left-eye video stream of an entry map in the AV clip.

When the playback start point is specified by time, the playback control unit 2800 starts playback from an address preceding other addresses which is shown by address information corresponding to the time. This makes it possible to read GOPs starting from a head of the left-eye GOP and a head of the right-eye GOP of a specified time.

When the playback apparatus has extra memory, and each entry map can be read to memory, the left-eye video stream and the right-eye video stream may be multiplexed regardless of a storage positional relationship.

(5) In the embodiment 1 described in the above, between a header packet of the left-eye GOP and an end packet of the left-eye GOP is arranged the right-eye GOP corresponding to the left-eye GOP. However, the right-eye GOP may be arranged between the header packet of the left-eye GOP and a header packet of the next left-eye GOP, or arranged before an end packet of the next left-eye GOP. By putting a restriction on a position at which the left-eye GOP and the right-eye GOP corresponding to the left-eye GOP are multiplexed in the above-stated way, it can be ensured that timing of reading the left-eye GOP and timing of reading the right-eye GOP are prevented from becoming out of synchronization with to each other when random access to the AV data is performed.

(6) The embodiment 1 described in the above describes the display capable of displaying 3D graphics. However, a display capable of displaying only 2D graphics exists in fact. In that case, it is difficult for the user to judge whether or not the display is capable of playing back 3D graphics. Therefore, it is preferable that the playback apparatus judges whether or not the display is capable of playing back 3D graphics without the user even noticing it.

Figure 24:
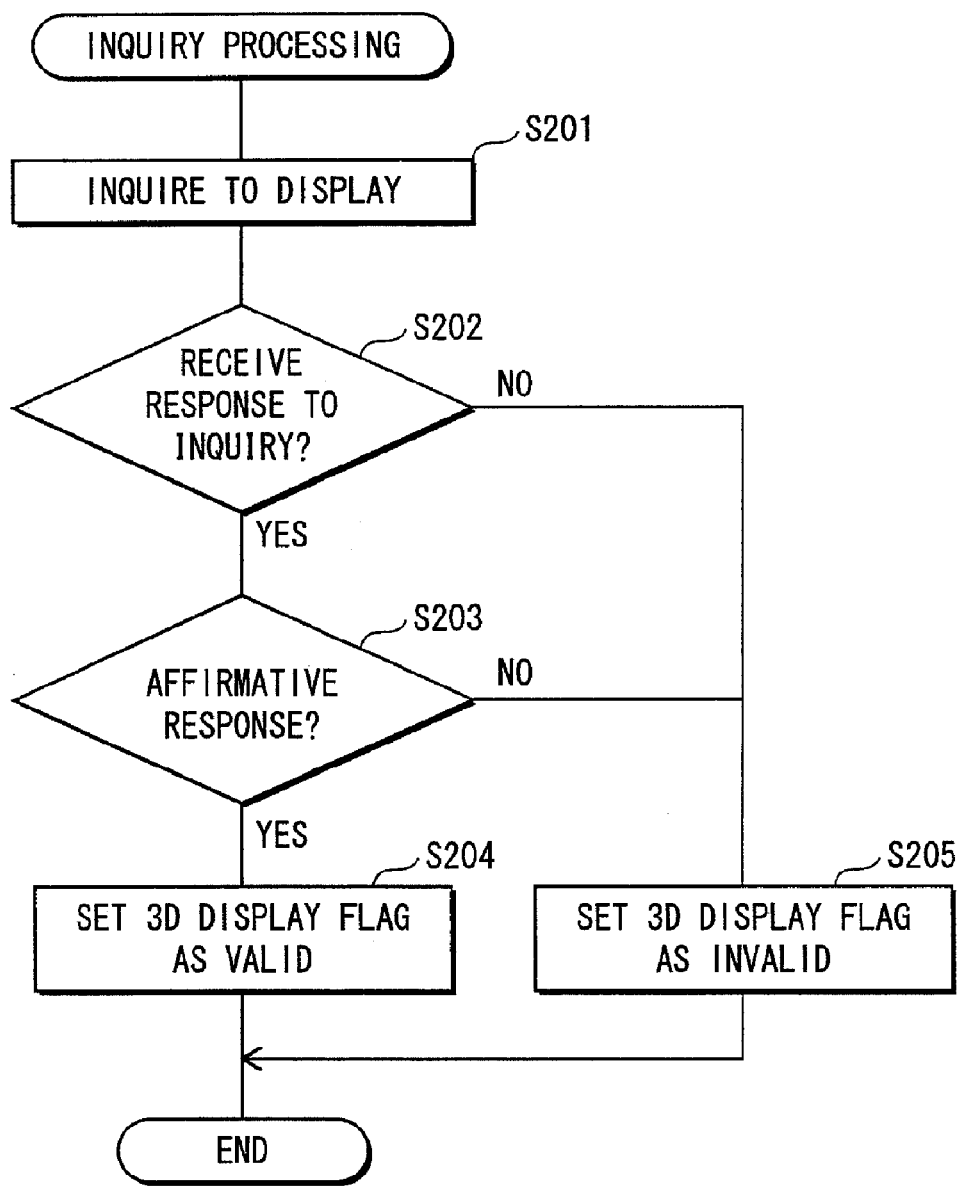
FIG. 24 shows a flowchart showing inquiry processing that inquires to the display whether 3D graphics can be displayed.

Specifically, this can be realized by the following method, for example. FIG. 24 is a flowchart showing inquiry processing that inquires to a display whether it is possible to display 3D graphics. The playback apparatus and the display are connected to one another via a HDMI cable. Firstly, the playback apparatus inquires to the display whether it is possible to display 3D graphics (Step S201). Receiving a response to such inquiry from the display (Step S202: Yes), the playback apparatus judges whether or not the response shows that it is possible to display 3D graphics (Step S203).

When the response shows that it is possible to display 3D graphics (Step S203: Yes), the playback apparatus sets a 3D display flag as valid with a predetermined memory of the playback apparatus (Step S204). Here, the 3D display flag shows that the display is capable of displaying 3D graphics. When the response shows that it is not possible to display 3D graphics (Step S203: No) or no appropriate response is made (Step S202: No), the playback apparatus sets the 3D display flag as invalid (Step S205).

When the 3D flag can be accessed from the BD program, whether or not the display connected to the playback apparatus is capable of displaying 3D graphics can be judged by the BD program. This allows controls to be made, such as playing back a 3D title when the 3D display flag is valid, and playing back a 2D title when the 3D display flag is invalid.

Also, when the 3D flag is valid, a header and the like may include information showing that content is 3D content when the playback apparatus transmits the 3D content to the display. This makes it possible, when the display receives 3D content, to reduce or lighten certain processing, such as by not performing the edge enhancement in the display as described in the above, or to add appropriate processing for viewing 3D graphics.

(7) In the embodiment 1 described in the above, a description is given taking the successive separation method and polarized glasses method as examples. However, when the stereoscopic viewing is realized using the lenticular lens, (i) setting is made such that the pictures of the left-eye video stream and corresponding pictures of the right-eye video stream have the same PTSs, (ii) the left-eye pictures and the corresponding right-eye pictures are arranged alternatively in a longitudinal direction on a screen simultaneously, and (iii) the lenticular lens is attached to the surface of the display. This allows the user to recognize the graphics displayed on the display stereoscopically.

(8) Play lists for the 3D playback may be played back by a BD-J application. The BD-J application is a Java application that runs a BD-J Title as a life cycle in a program execution unit that is fully provided with Java 2 Micro_Edition (J2ME), Personal Basis Profile (PBP 1.0) and Globally Executable MHP specification (GEM 1.0.2) for package media targets.

The program execution unit is composed of a Java™ (registered trademark) virtual machine, a configuration and a profile. The BD-J application can start playback of AV by instructing the Java™ virtual machine to generate a JMF player instance that plays back the play list information. The JMF (Java Media Frame work) player instance is actual data generated on a heap memory of the virtual machine based on the JMF player class.

Also, the program execution unit includes a standard Java library for displaying JFIF (JPEG), PNG and other image data. Therefore, the BD-J application can realize a GUI framework. The GUI framework in the Java application includes a HAVi framework stipulated in GEM 1.0.2, and a memory control navigation system in the GEM 1.0.2.

Thus, the BD-J application can realize screen display in which button display, text display, and online display (content of BBS) that are based on the HAVi framework are combined with display of moving pictures. Also, the BD-J application can perform operation for such screen display using a remote control.

It is also possible to provide a combination of any of the embodiments and supplementary remarks described in the above.

Although the present invention has been fully described by way of examples with reference to accompanying drawings, it is to be noted that various changes and modifications will be apparent to those skilled in the art. Therefore, unless otherwise such changes and modifications depart from the scope of the present invention, they should be constructed as being included therein.

The present invention can be widely applied to any recording media that store therein 3D graphics.

What is claimed is:

1. A non-transitory recording medium, comprising:
a digital stream area in which a digital stream having a first video stream including a first-type Group of Pictures (GOP) and a second video stream including a second-type Group of Pictures (GOP) is recorded; and
a map information area in which map information is recorded, the map information having an entry address and an entry time on a time axis of the digital stream for providing the reliable playback and stereoscopic viewing of moving pictures in the digital stream, the entry address showing a beginning of a GOP pair region in the digital stream area,
wherein the GOP pair region has the first-type GOP and the second-type GOP, the first-type GOP is data having moving pictures to be played back from the entry time on the time axis of the digital stream, and the second-type GOP is data to be played back together with the first-type GOP to provide a user with a stereoscopic view of the digital stream,
wherein the first-type GOP is divided into a plurality of packets and the second-type GOP is divided into a plurality of packets, the plurality of packets formed from the first-type GOP and the plurality of packets formed from the second-type GOP being multiplexed together,
wherein a header packet of the plurality of packets formed from the first-type GOP precedes, on the digital stream, a header packet of the plurality of packets formed from the second-type GOP and the header packet of the plurality of packets formed from the second-type GOP precedes, on the digital stream, an end packet of the plurality of packets formed from the first-type GOP, and the entry address in the map information is represented as a packet number assigned to the header packet of the plurality of packets formed from the first-type GOP, and wherein each packet of the plurality of packets formed from the second-type GOP has information showing that the packet having the information carries the second video stream.

2. The non-transitory recording medium of claim 1, wherein the entry address is one of a plurality of entry addresses, and each packet formed from the second-type GOP is located before an entry address that is one of the plurality of entry addresses and is immediately next to the entry address showing the beginning of the GOP pair region in the digital stream area.

3. The non-transitory recording medium of claim 1, wherein
each packet formed from the second-type GOP precedes an end packet of the plurality of packets formed from the first-type GOP.

4. A recording apparatus, comprising:
a generating unit operable to generate a digital stream; and
a recording unit operable to record the generated digital stream on the recording medium,
wherein the digital stream includes (i) a first video stream having a first-type Group of Pictures (GOP) which is data having moving pictures to start being played back at an entry time on a time axis of the digital stream, (ii) a second video stream having a second-type Group of Pictures (GOP) which is data to be played back together with the first-type GOP to provide a user with a stereoscopic view of the digital stream, and (iii) map information having an entry address and the entry time,
wherein the entry address is one of a plurality of addresses assigned to an area in which the digital stream is recorded,
wherein the generating unit divides the first-type GOP into a plurality of packets and divides the second-type GOP into a plurality of packets, and multiplexes together the plurality of packets formed from the first-type GOP and the plurality of packets formed from the second-type GOP, such that a header packet of the plurality of packets formed from the first-type GOP precedes, on the digital stream, a header packet of the plurality of packets formed from the second-type GOP and the header packet of the plurality of packets formed from the second-type GOP precedes, on the digital stream, an end packet of the plurality of packets formed from the first-type GOP, and
wherein each packet of the plurality of packets formed from the second-type GOP has information showing that the packet having the information carries the second video stream.

5. A reproduction method for reproducing a non-transitory recording medium containing a digital stream area in which a digital stream having a first video stream including a first-type Group of Pictures (GOP) and a second video stream including a second-type Group of Pictures (GOP) is recorded, and a map information area in which map information is recorded, the map information having an entry address and an entry time on a time axis of the digital stream, the entry address showing a beginning of a GOP pair region in the digital stream area, wherein the GOP pair region has the first-type GOP and the second-type GOP, the first-type GOP is data having moving pictures to be played back from the entry time on the time axis of the digital stream and the second-type GOP is data to be played back together with the first-type GOP to provide a user with a stereoscopic view of the digital stream, the first-type GOP is divided into a plurality of packets and the second-type GOP is divided into a plurality of packets, and the plurality of packets formed from the first-type GOP and the plurality of packets formed from the second-type GOP are multiplexed together, a header packet of the plurality of packets formed from the first-type GOP precedes, on the digital stream, a header packet of the plurality of packets formed from the second-type GOP and the header packet of the plurality of packets formed from the second-type GOP precedes, on the digital stream, an end packet of the plurality of packets formed from the first-type GOP, and the entry address in the map information is represented as a packet number assigned to the header packet of the plurality of packets formed from the first-type GOP, and wherein each packet of the plurality of packets formed from the second-type GOP has information showing that the packet having the information carries the second video stream, the reproduction method, comprising:
reading (i) the map information having the entry address and the entry time from the non-transitory recording medium, and (ii) the header packet of the plurality of packets formed from the first-type GOP from the non-transitory recording medium, based on the entry address, before reading the header packet of the plurality of packets formed from the second-type GOP from the non-transitory recording medium.

6. A reproduction apparatus for reproducing a non-transitory recording medium containing a digital stream area in which a digital stream having a first video stream including a first-type Group of Pictures (GOP) and a second video stream including a second-type Group of Pictures (GOP) is recorded, and a map information area in which map information is recorded, the map information having an entry address and an entry time on a time axis of the digital stream, the entry address showing a beginning of a GOP pair region in the digital stream area, wherein the GOP pair region has the first-type GOP and the second-type GOP, the first-type GOP is data having moving pictures to be played back from the entry time on the time axis of the digital stream and the second-type GOP is data to be played back together with the first-type GOP to provide a user with a stereoscopic view of the digital stream, the first-type GOP is divided into a plurality of packets and the second-type GOP is divided into a plurality of packets, the plurality of packets formed from the first-type GOP and the plurality of packets formed from the second-type GOP are multiplexed together, a header packet of the plurality of packets formed from the first-type GOP precedes, on the digital stream, a header packet of the plurality of packets formed from the second-type GOP and the header packet of the plurality of packets formed from the second-type GOP precedes, on the digital stream, an end packet of the plurality of packets formed from the first-type GOP, the entry address in the map information is represented as a packet number assigned to the header packet of the plurality of packets formed from the first-type GOP, and each packet of the plurality of packets formed form the second-type GOP has information showing that the packet having the information carries the second video stream, the reproduction apparatus, comprising:
a reading unit operable to read (i) the map information having the entry address and the entry time from the non-transitory recording medium, and (ii) the header packet of the plurality of packets formed from the first-type GOP from the non-transitory recording medium, based on the entry address, before reading the header packet of the plurality of packets formed from the second-type GOP from the non-transitory recording medium.

7. A non-transitory recording medium, comprising:

a digital stream having a first video stream used for monoscopic video playback and a second video stream used for stereoscopic video playback in combination with the first video stream, a second-type Group of Pictures belonging to the second video stream being used for stereoscopic video playback in combination with a first-type Group of Pictures belonging to the first video stream, a plurality of packets formed from the first-type Group of Pictures and a plurality of packets formed from the second-type Group of Pictures being multiplexed in such a manner that a header packet of the plurality of packets formed from the first-type Group of Pictures precedes, on the digital stream, a header packet of the plurality of packets formed from the second-type Group of Pictures and the header packet of the plurality of packets formed from the second-type Group of Pictures precedes, on the digital stream, an end packet of the plurality of packets formed from the first-type Group of pictures, and each packet of the plurality of packets formed from the second-type Group of Pictures having information showing that the packet having the information carries the second video stream; and map information having an entry address and an entry time for providing the reliable playback and stereoscopic viewing of moving pictures in the digital stream, the entry address being a packet number assigned to the header packet of the plurality of packets formed from the first-type Group of Pictures, the entry time being a presentation time assigned to the header packet of the plurality of packets formed from the first-type Group of Pictures.

8. A reproduction apparatus for reproducing a non-transitory recording medium including a digital stream and map information, wherein the digital stream has a first video stream used for monoscopic video playback and a second video stream used for stereoscopic video playback in combination with the first video stream, a second-type Group of Pictures belonging to the second video stream being used for stereoscopic video playback in combination with a first-type Group of Pictures belonging to the first video stream, a plurality of packets formed from the first-type Group of Pictures and a plurality of packets formed from the second-type Group of Pictures being multiplexed in such a manner that a header packet of the plurality of packets formed from the first-type Group of Pictures precedes, on the digital stream, a header packet of the plurality of packets formed from the second-type Group of Pictures and the header packet of the plurality of packets formed from the second-type Group of Pictures precedes, on the digital stream, an end packet of the plurality of packets formed from the first-type Group of Pictures, and each packet of the plurality of packets formed from the second-type Group of Pictures having information showing that the packet having the information carries the second video stream, and wherein the map information has an entry address and an entry time, the entry address being a packet number assigned to the header packet of the plurality of packets formed from the first-type Group of Pictures, the entry time being a presentation time assigned to the header packet of the plurality of packets formed from the first-type Group of Pictures, the reproduction apparatus, comprising:

a reading unit operable to read (i) the map information from the non-transitory recording medium, and (ii) the header packet of the plurality of packets formed from the first-type Group of Pictures from the non-transitory recording medium, based on the entry address, before reading the header packet of the plurality of packets formed from the second-type Group of Pictures from the non-transitory recording medium.

* * * * *